United States Patent
Jeon et al.

(10) Patent No.: US 12,537,963 B2
(45) Date of Patent: Jan. 27, 2026

(54) METHOD AND APPARATUS FOR VIDEO CODING USING IMPROVED CROSS-COMPONENT LINEAR MODEL PREDICTION

(71) Applicants: HYUNDAI MOTOR COMPANY, Seoul (KR); KIA CORPORATION, Seoul (KR); Research & Business Foundation SUNGKYUNKWAN UNIVERSITY, Suwon-si (KR)

(72) Inventors: Byeung Woo Jeon, Seongnam-si (KR); Bum Yoon Kim, Yongin-si (KR); Jee Hwan Lee, Gwacheon-si (KR); Seung Wook Park, Yongin-si (KR); Jin Heo, Yongin-si (KR)

(73) Assignees: HYUNDAI MOTOR COMPANY, Seoul (KR); KIA CORPORATION, Seoul (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 95 days.

(21) Appl. No.: 18/530,974

(22) Filed: Dec. 6, 2023

(65) Prior Publication Data

US 2024/0155134 A1    May 9, 2024

Related U.S. Application Data

(63) Continuation of application No. PCT/KR2022/007948, filed on Jun. 3, 2022.

(30) Foreign Application Priority Data

Jun. 7, 2021 (KR) .................. 10-2021-0073659
Jun. 3, 2022 (KR) .................. 10-2022-0067918

(51) Int. Cl.
H04N 19/00    (2014.01)
H04N 19/159   (2014.01)
(Continued)

(52) U.S. Cl.
CPC ......... H04N 19/159 (2014.11); H04N 19/176 (2014.11); H04N 19/186 (2014.11)

(58) Field of Classification Search
None
See application file for complete search history.

(56) References Cited

U.S. PATENT DOCUMENTS 10,652,575 B2    5/2020   Zhang et al.
10,841,593 B2    11/2020  Zhao et al.
(Continued)

FOREIGN PATENT DOCUMENTS

KR    20190046852 A    5/2019
KR    20200113173 A    10/2020
(Continued)

OTHER PUBLICATIONS

Kim. "KR 2021-0003054A Translation". Jan. 2021. (Year: 2021).*
(Continued)

*Primary Examiner* — Zhihan Zhou
(74) *Attorney, Agent, or Firm* — Lempia Summerfield Katz LLC

(57) ABSTRACT

A method and an apparatus are disclosed for video coding using improved cross-component linear model (CCLM) prediction. The video coding method and the apparatus generate a first predictor of a current chroma block according to CCLM prediction, and additionally generate a second predictor of the current chroma block based on the neighboring pixels of the current chroma block in intra prediction of the current chroma block. The video coding method and (Continued)

the apparatus perform weighted combination on the first predictor and the second predictor.

13 Claims, 31 Drawing Sheets

(51) Int. Cl.
*H04N 19/176* (2014.01)
*H04N 19/186* (2014.01)

(56) References Cited

U.S. PATENT DOCUMENTS

| | | | |
|---|---|---|---|
| 2016/0373769 A1* | 12/2016 | Zhao | H04N 19/176 |
| 2018/0077426 A1* | 3/2018 | Zhang | H04N 19/157 |
| 2021/0014506 A1* | 1/2021 | Zhang | H04N 19/463 |
| 2022/0150470 A1* | 5/2022 | Sim | H04N 19/139 |

FOREIGN PATENT DOCUMENTS

| | | | | |
|---|---|---|---|---|
| KR | 102194113 B1 | 12/2020 | | |
| KR | 20210003054 A | 1/2021 | | |
| WO | WO-2020190077 A1 * | 9/2020 | | H04N 19/105 |

OTHER PUBLICATIONS

International Search Report and Written Opinion cited in corresponding international app No. PCT/KR2022/007948; Sep. 20, 2022; 9 pp.

* cited by examiner

| | Corresponding luma region |
| | Neighboring pixels of corresponding luma region |
| | Current chroma block |
| | Neighboring pixels of current chroma block |

Information used at time of intra prediction of chroma channel
   ① – Information on corresponding luma region
   ② – Information on same channel ☐ Neighboring blocks adjacent to current chroma block ☐ Neighboring pixels of current chroma block ☐ Adjacent blocks using first representative mode (top neighboring pixel line)

⌐ ⌐
⌊_⌋ Adjacent blocks using second representative mode (left neighboring pixel line)

☐ Neighboring blocks adjacent to current chroma block

☐ Adjacent blocks with same aspect ratio as (or most similar) to current block

☐ Neighboring blocks adjacent to current chroma block

☐ Left adjacent block with same aspect ratio as (or most similar aspect ratio to) current block ☐ Top adjacent block with same aspect ratio as (or most similar aspect ratio to) current block Corresponding luma region Corresponding luma region ☐ Luma blocks included corresponding luma region ☐ Blocks using representative mode in region Corresponding luma region ☐ Luma blocks included corresponding luma region ☐ Block with same aspect ratio as (or most similar aspect ratio to) current block in region ☐ Neighboring blocks adjacent to current chroma block ☐ Adjacent blocks using representative mode ☐ Neighboring blocks adjacent to current chroma block ☐ Adjacent blocks using representative mode Corresponding luma region ☐ Luma blocks included corresponding luma region ☐ Blocks using representative mode in region Corresponding luma region ☐ Luma blocks included corresponding luma region ☐ Blocks using representative mode in region

METHOD AND APPARATUS FOR VIDEO CODING USING IMPROVED CROSS-COMPONENT LINEAR MODEL PREDICTION

CROSS-REFERENCE TO RELATED APPLICATIONS

This application is a continuation of International Application No. PCT/KR2022/007948 filed on Jun. 3, 2022, which claims priority to and the benefit of Korean Patent Application No. 10-2021-0073659, filed on Jun. 7, 2021, and Korean Patent Application No. 10-2022-0067918, filed on Jun. 3, 2022, the entire disclosures of each of which are incorporated herein by reference.

TECHNICAL FIELD

The present disclosure relates to a video encoding method and an apparatus using improved cross-component linear model (CCLM) prediction.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Generally, an encoding target video is partitioned into coding units (CUs) with various shapes and sizes, and then each coding unit (CU) is encoded. A tree structure represents information defining the partitioning of the CU units and may be transferred from an encoder to a decoder to indicate a partitioning type of a video. When a video is partitioned into CUs, a luma video and a chroma image may be partitioned separately. Alternatively, a luma signal and a chroma signal may be partitioned into CUs with the same structure. In this case, a technology in which the luma signal and the chroma signal have different partitioning structures is called CST (Chroma Separate Tree) technology or dual tree technology. When the CST technology is used, a chroma block may have a different partitioning method than a luma block. Further, a technology in which the luma signal and the chroma signal have the same partitioning structure is called a single tree technology. When the single tree technique is used, the chroma block has the same partitioning method as the luma block.

Meanwhile, there is a linear relationship between pixels of the chroma signal and corresponding pixels of the luma signal. Therefore, there is Cross-Component Linear Model (CCLM) prediction as related art capable of generating an intra predictor of the chroma signal from the pixels of the luma signal based on this linear relationship. For intra prediction of the current chroma block, in the CCLM prediction, a luma region corresponding to the current chroma block within the luma video is first determined. Thereafter, in the CCLM prediction, a linear model between pixels on neighboring pixel lines of the current chroma block and corresponding luma pixels is derived. Finally, in the CCLM prediction, a predictor of the current chroma block is generated from a pixel value of a corresponding luma region using the derived linear model.

In the CCLM prediction, the neighboring pixels of the current chroma block are used for derivation of a linear model as described above, but there is a problem that the neighboring pixels are not used at the time of generating a predictor. Therefore, a method of additionally using the neighboring pixels of the current chroma block when CCLM prediction is utilized to improve video quality and coding efficiency at the time of intra prediction of the current chroma block needs to be considered.

SUMMARY

The present disclosure seeks to provide a video coding method and an apparatus for generating a first predictor of a current chroma block according to Cross-Component Linear Model (CCLM) prediction and for additionally generating a second predictor of the current chroma block based on the neighboring pixels of the current chroma block. The video coding method and the apparatus perform weighted combination on the first predictor and the second predictor, in order to improve prediction performance of the CCLM prediction in intra prediction of the current chroma block.

At least one aspect of the present disclosure provides an intra prediction method for a current chroma block performed by a computing device. The intra prediction method includes acquiring a cross-component prediction mode for cross-component prediction for the current chroma block. Here, the cross-component prediction includes predicting the current chroma block using pixels in a corresponding luma region for the current chroma block and the corresponding luma region. The intra prediction method also includes generating a first predictor of the current chroma block by performing the cross-component prediction based on the cross-component prediction mode. The intra prediction method also includes inferring a representative mode from prediction modes of adjacent blocks of the current chroma block. The intra prediction method also includes generating a second predictor of the current chroma block by performing intra prediction using neighboring pixels of the current chroma block based on the representative mode. The intra prediction method also includes deriving weights for the first predictor and the second predictor and generating an intra predictor of the current chroma block by performing weighted sum on the first predictor and the second predictor using the weights.

Another aspect of the present disclosure provides an intra prediction method for a current chroma block performed by a computing device. The intra prediction method includes acquiring an intra prediction mode using neighboring pixels of the current chroma block and generating a first predictor of the current chroma block by performing intra prediction based on the intra prediction mode. The intra prediction method also includes setting a representative mode to a preset cross-component mode for cross-component prediction for the current chroma block. Here, the cross-component prediction includes predicting the current chroma block using pixels of a corresponding luma region for the current chroma block and the corresponding luma region. The intra prediction method also includes generating a second predictor of the current chroma block by performing a cross component prediction based on the representative mode. The intra prediction method also includes deriving weights for the first predictor and the second predictor and generating an intra predictor of the current chroma block by performing weighted sum on the first predictor and the second predictor using the weights.

Yet another aspect of the present disclosure provides an intra prediction device. The intra prediction device includes an input unit configured to acquire a cross-component prediction mode for cross-component prediction for a current chroma block. Here, the cross-component prediction includes predicting the current chroma block using pixels in a corresponding luma region for the current chroma block and the corresponding luma region. The intra prediction device also includes a first predictor generator configured to generate a first predictor of the current chroma block by performing the cross-component prediction based on the cross-component prediction mode. The intra prediction device also includes a second predictor generator configured to infer a representative mode from prediction modes of adjacent blocks of the current chroma block and generate a second predictor of the current chroma block by performing intra prediction using neighboring pixels of the current chroma block based on the representative mode. The intra prediction device also includes a weighted summer configured to deriving weights for the first predictor and the second predictor and perform weighted sum on the first predictor and the second predictor using the weights to generate an intra predictor of the current chroma block.

As described above, the present disclosure provides a video coding method and an apparatus for generating a first predictor of a current chroma block according to Cross-Component Linear Model (CCLM) prediction and for additionally generating a second predictor of the current chroma block based on the neighboring pixels of the current chroma block in intra prediction of the current chroma block. The video coding method and the apparatus perform weighted combination on the first predictor and the second predictor, in order to improve prediction performance of the CCLM prediction.

DETAILED DESCRIPTION

Figure 1:
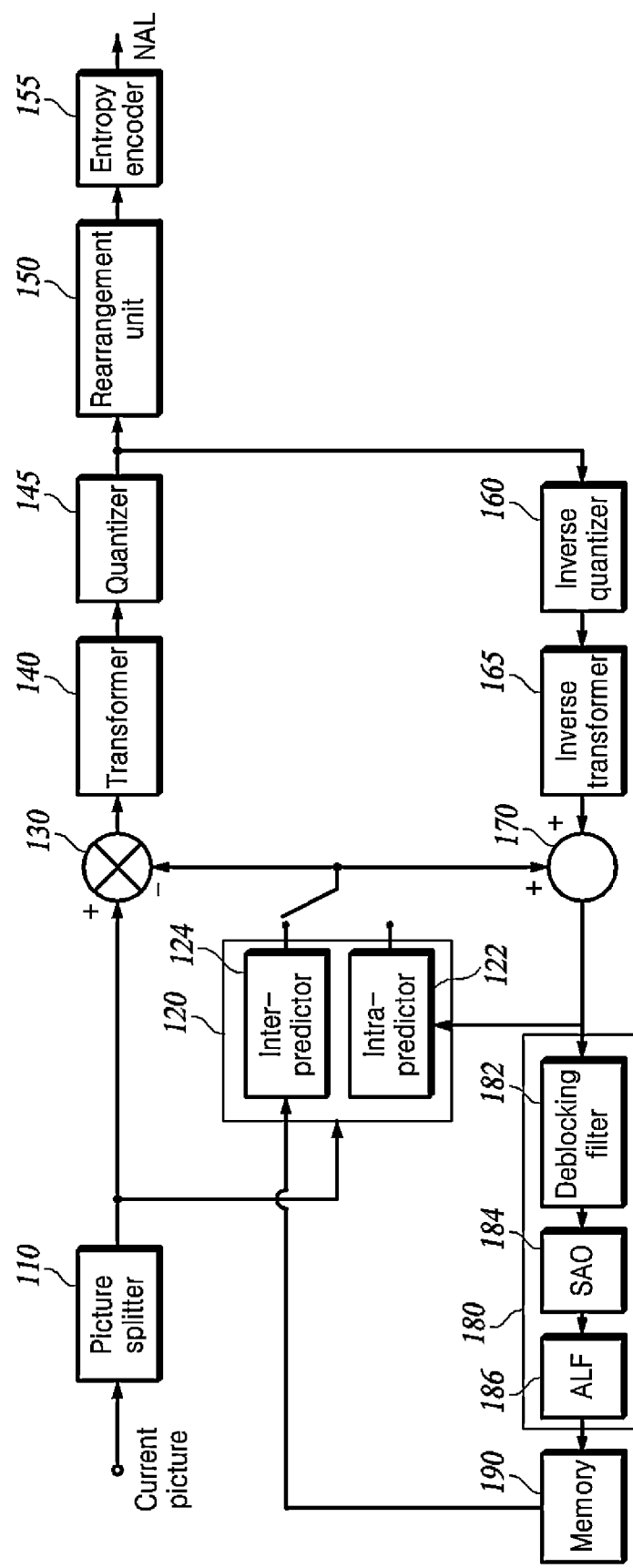
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
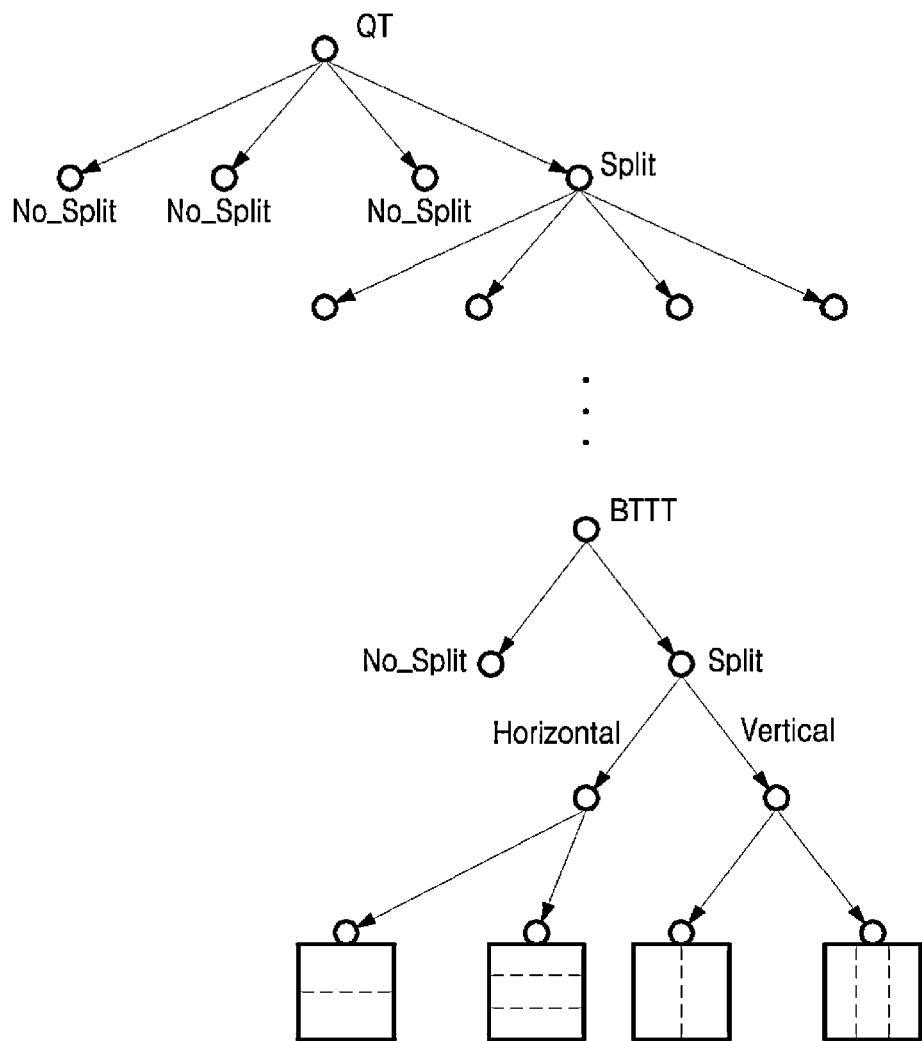
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
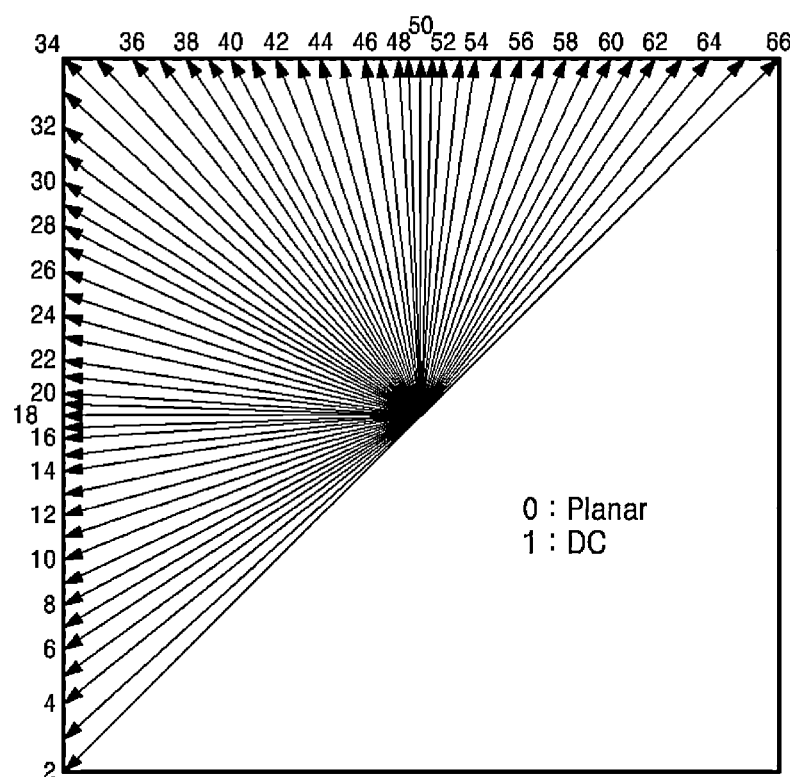
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
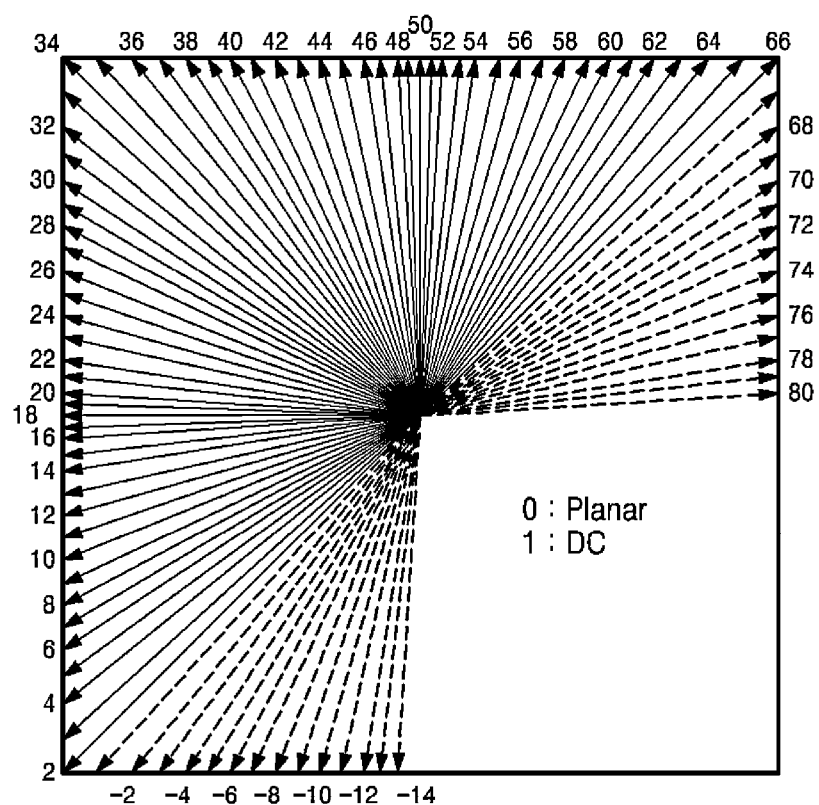

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
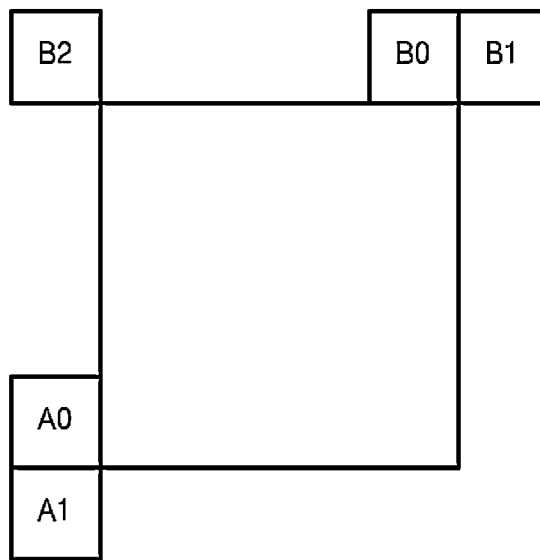
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
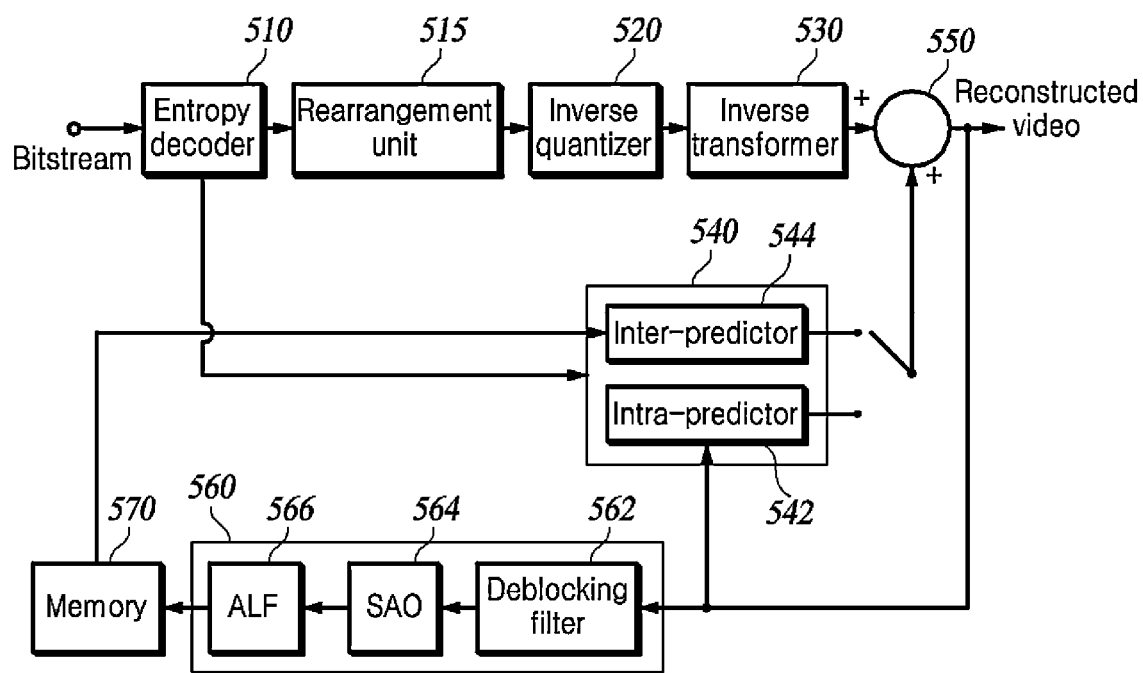
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for generating a first predictor of the current chroma block according to the cross-component linear model (CCLM) prediction and for additionally generating a second predictor of the current chroma block generated based on the neighboring pixels of the current chroma block in intra prediction of the current chroma block. The video coding method and the apparatus perform weighted combination on the first predictor and the second predictor.

The following embodiments may be commonly applied to the intra predictor 122 in the video encoding apparatus and an intra predictor 542 in the video decoding apparatus.

In the following description, the term 'target block' to be encoded or decoded may be used in the same sense as the current block or coding unit (CU) as described above, or the 'target block' may mean a partial region of the coding unit.

Hereinafter, the target block includes a luma block including a luma component and a chroma block including a chroma component. The chroma block of the target block is expressed as a target chroma block or a current chroma block. The luma block of the target block is expressed as a target luma block or a current luma block.

Further, an aspect ratio of a block is defined as a value obtained by dividing a horizontal length of the block by a vertical length.

I. Cross-Component Linear Model (CCLM) Prediction

In the Versatile Video Coding (VVC) technology, the intra prediction mode of the luma block includes subdivided directional modes (i.e., 2 to 66), in addition to the non-directional modes (i.e., planar and DC), as illustrated in FIG. 3A. Further, the intra prediction mode of the luma block includes directional modes (−14 to −1 and 67 to 80) according to the wide angle intra prediction, as added to the example of FIG. 3B.

Meanwhile, the chroma block may also use the intra prediction in the subdivided directional mode in a limited manner depending on the prediction direction used by the luma block. However, in the intra prediction of the chroma block, various directional modes other than the horizontal and vertical directions that can be used by the luma block cannot always be used. To be able to use these various directional modes, the prediction mode of the current chroma block should be set to the derived mode (DM). This setting of the prediction mode to the DM mode allows the current chroma block to use the directional modes other than horizontal and vertical of the luma block.

When the chroma block is encoded, the intra prediction modes that has a high use frequency or is most basically used to maintain image quality include planar, DC, Vertical, Horizontal, and DM modes. In this case, in the DM mode, the intra prediction mode of the luma block spatially corresponding to the current chroma block is used as the intra prediction mode of the chroma block.

The video encoding apparatus may signal whether or not the intra prediction mode of the chroma block is the DM mode to the video decoding apparatus. In this case, there may be several methods of transferring the DM mode to the video decoding apparatus. For example, the video encoding apparatus may set intra_chroma_pred_mode, which is information for indicating the intra prediction mode of the chroma block, to a specific value and then may transmit intra_chroma_pred_mode to the video decoding apparatus to indicate whether or not the intra prediction mode is the DM mode.

When the chroma block is encoded in the intra prediction mode, the intra predictor 542 of the video decoding apparatus may set the intra prediction mode IntraPredModeC of the chroma block according to Table 1.

Hereinafter, in order to distinguish between intra_chroma_pred_mode and IntraPredModeC, which are information related to the intra prediction mode of the chroma block, intra_chroma_pred_mode and IntraPredModeC are expressed as a chroma intra prediction mode indicator and a chroma intra prediction mode, respectively.

TABLE 1

| | | | lumaIntraPredMode | | | | |
|---|---|---|---|---|---|---|---|
| cclm_mode_flag | cclm_mode_idx | intra_chroma_pred_mode | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

Here, lumaIntraPredMode is the intra prediction mode of the luma block corresponding to the current chroma block (hereinafter referred to as 'luma intra prediction mode'). lumaIntraPredMode represents one of the prediction modes illustrated in FIG. 3A. For example, in Table 1, lumaIntraPredMode=0 indicates a planar prediction mode, and lumaIntraPredMode=1 indicates a DC prediction mode. When lumaIntraPredMode is 18, 50, and 66, these values indicate directional modes referred to as Horizontal, Vertical, and VDIA, respectively. Meanwhile, when intra_chroma_pred_mode=0, 1, 2, and 3, these values indicate planar, Vertical, Horizontal, and DC prediction mode, respectively. A case in which intra_chroma_pred_mode=4 is the DM mode, and an IntraPredModeC value, which is a chroma intra prediction mode, is set to be equal to the lumaIntraPredMode value.

Hereinafter, the present embodiment is described focusing on parsing of encoding information in the video decoding apparatus. Here, the video encoding apparatus is referred to, when necessary for convenience of description. Nevertheless, most of the embodiments to be described hereinafter can be equally or similarly applied to the video encoding apparatus. Meanwhile, the video encoding apparatus determines encoding information in terms of rate distortion optimization. Thereafter, the video encoding apparatus encodes the information to generate a bitstream and then signals the bitstream to the video decoding apparatus. Further, the video encoding apparatus may acquire encoding information from the high level and proceed with subsequent processes.

A method of generating a prediction block of the current block from a color component different from a color component of the target block to be currently encoded or decoded in performing the prediction in the video encoding/decoding apparatus is defined as cross-component prediction. In the VVC technology, the cross-component prediction is performed using a linear relationship between chroma pixels and corresponding luma pixels to intra-predict the current chroma block, which is called CCLM (Cross-component Linear Model) prediction. Hereinafter, the CCLM prediction is described.

First, a process of parsing the intra prediction mode of the chroma block performed by the video decoding apparatus is as shown in Table 2.

TABLE 2

[CU Level]

if( CclmEnabled )
    cclm_mode_flag

TABLE 2-continued

[CU Level]

if( cclm_mode_flag )
    cclm_mode_idx
else
    intra_chroma_pred_mode

The video decoding apparatus parses a cclm_mode_flag, which indicates whether or not a CCLM prediction mode is used. When cclm_mode_flag is 1 and the CCLM mode is used, the video decoding apparatus parses cclm_mode_idx and parses an index of the CCLM mode. In this case, the CCLM mode may indicate one of three modes depending on a value of cclm_mode_idx. On the other hand, when cclm_mode_flag is 0 and the CCLM mode is not used, the video decoding apparatus parses intra_chroma_pred_mode indicating intra prediction mode, as described above.

Figure 6:
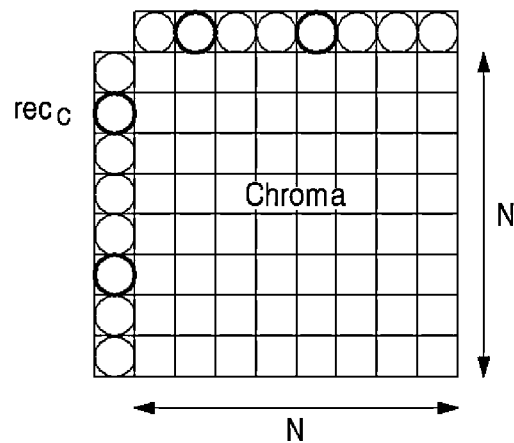
FIG. 6 is an illustrative diagram illustrating neighboring pixels referenced for cross-component linear model (CCLM) prediction.
Figure 6:
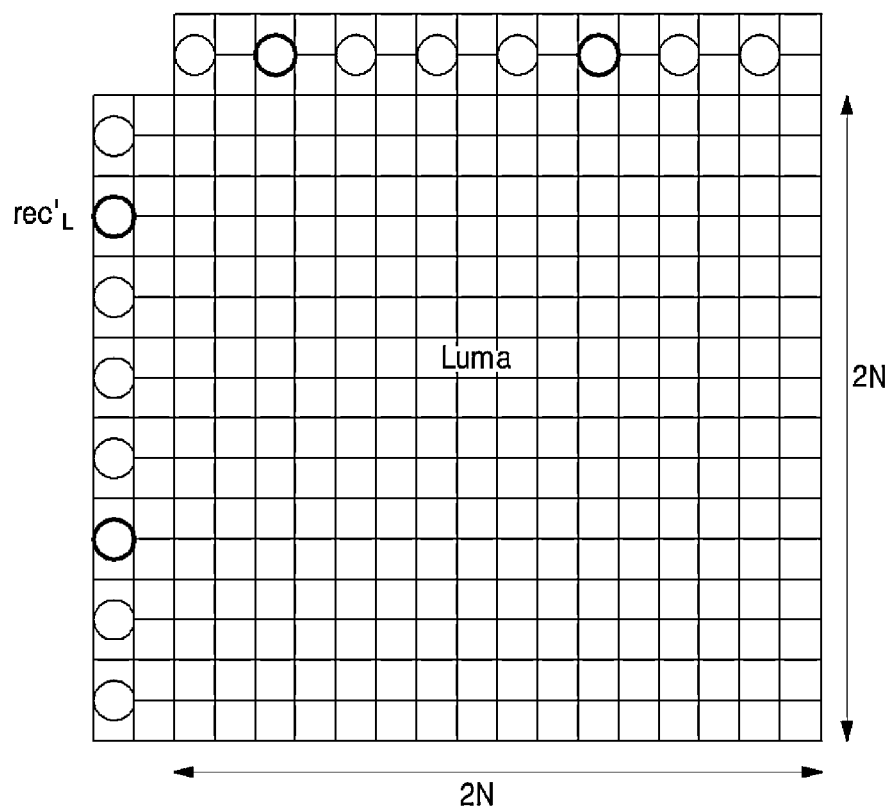

FIG. 6 is an illustrative diagram illustrating neighboring pixels referenced for CCLM prediction.

When the CCLM mode is applied for intra prediction of the current chroma block, the video decoding apparatus determines a region in the luma video corresponding to the current chroma block (hereinafter, a 'corresponding luma region'). For prediction of a linear model, left reference pixels and above reference pixels of the corresponding luma region, and left reference pixels and above reference pixels of the target chroma block may be used. Hereinafter, the left reference pixels and the above reference pixels are integrated and expressed as reference pixels, neighboring pixels, or adjacent pixels. Further, reference pixels of the chroma component are indicated as chroma reference pixels, and reference pixels of the luma component are indicated as luma reference pixels. Meanwhile, in the illustration of FIG. 6, a size of the chroma block, i.e., the number of pixels is expressed as N×N (here N is a natural number).

In the CCLM prediction, a linear model is derived between the reference pixels of the luma region and the reference pixels of the chroma block, and then, the linear model is applied to the restored pixels of the corresponding luma region, so that a prediction block that is a predictor of the target chroma block is generated. For example, as illustrated in FIG. 6, four pairs of pixels that are combinations of pixels in neighboring pixel lines of the current chroma block and pixels in the corresponding luma region may be used for derivation of the linear model. The video decoding apparatus may derive α and β representing the linear model for the four pairs of pixels, as shown in Equation 1.

$$\alpha = \frac{Y_b - Y_a}{X_b - X_a}, \beta = Y_a - \alpha \cdot X_a \quad \text{[Equation 1]}$$

Here, for the corresponding luma pixels among the four pairs of pixels, $X_a$ and $X_b$ represent an average value of two minimum values and an average value of two maximum values, respectively. Further, for the chroma pixels, $Y_a$ and $Y_b$ represent an average value of two minimum values and an average value of two maximum values. Thereafter, the video decoding apparatus generates a predictor $pred_C(i, j)$ of the current chroma block from the pixel value $rec'_L(i,j)$ of the corresponding luma region using the linear model, as shown in Equation 2.

$$pred_C(i,j) = \alpha \cdot rec'_L(i,j) + \beta \quad \text{[Equation 2]}$$

Before the linear model is applied, the video decoding apparatus confirms whether the size of the corresponding luma region is the same as the size of the current chroma block. When the two sizes are different depending on a subsampling scheme of the chroma channel, the video decoding apparatus may adjust the size of the corresponding luma region so that the size of the corresponding luma region is the same as the size of the current chroma block by applying downsampling to the corresponding luma region.

Meanwhile, as described above, the CCLM mode is divided into three modes includes CCLM_LT, CCLM_L, and CCLM_T depending on positions of neighboring pixels that are used in a process of deriving the linear model. As illustrated in FIG. 6, the CCLM_LT mode uses two pixels in each direction among the neighboring pixels adjacent to a left side and top side of the current chroma block. CCLM_L uses four pixels among the neighboring pixels adjacent to the left side of the current chroma block. Lastly, CCLM_T uses four pixels among the neighboring pixels adjacent to the upper end of the current chroma block.

II. Intra Prediction of Current Chroma Block According to Present Disclosure

Figure 7:
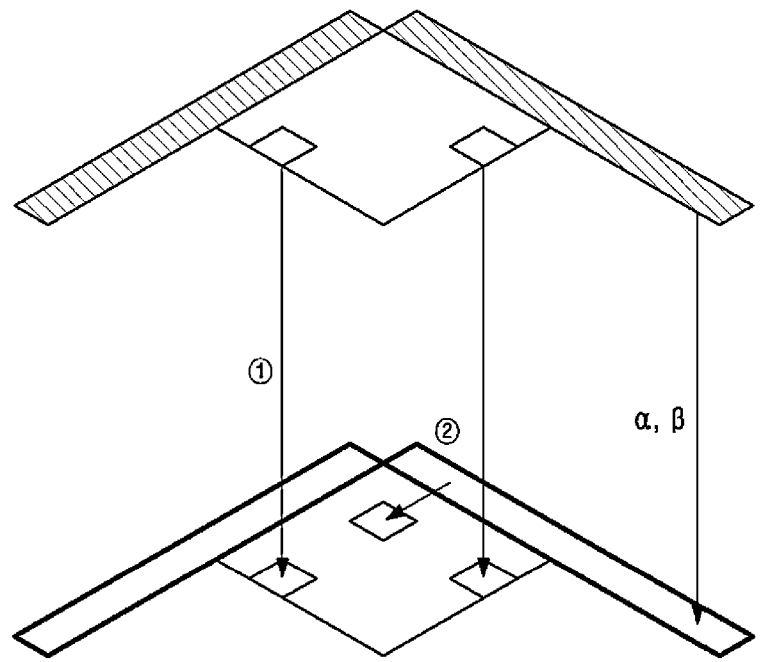
FIG. 7 is an illustrative diagram illustrating information that may be used in intra prediction of a chroma channel

FIG. 7 is an illustrative diagram illustrating information that may be used in intra prediction of a chroma channel For the intra prediction of the chroma channel, the video decoding apparatus may use a method of generating a predictor using the information on the corresponding luma region (①) or a method of generating a predictor using the information on the same channel (②). In the VVC technology, there are various schemes for each method, and these schemes are divided into prediction modes. Further, a predictor generation method may be designated by indicating the prediction mode. Hereinafter, setting the predictor generation method is described as setting the prediction mode. Hereinafter, generating a predictor using the information on the corresponding luma region (①) is expressed as 'cross component prediction', and the method is expressed as a 'cross component prediction mode' or a 'cross component prediction method'. Further, generating a predictor using the information on the same channel (②) is expressed as 'co-channel prediction', and the method is expressed as a 'co-channel prediction mode' or a 'co-channel prediction method'.

For example, among intra prediction methods of the chroma channel in the VVC technology, the cross component prediction method using the information on the corresponding luma region (①) includes the CCLM mode as described above. An example of other cross component prediction methods includes a method of deriving a plurality of linear models between the corresponding luma region and the current chroma block and performing prediction using the linear models. Another example of other cross component prediction methods includes a method of deriving linear models using a gradient value (i.e., a change value) based on a pixel value instead of a luma pixel value at a corresponding position and performing prediction using the linear models. Another example of other cross component prediction methods includes a method of performing prediction using many-to-one matching that also uses a corresponding luma pixel at the same position and neighboring pixel values when predicting one pixel value of the current chroma block.

Meanwhile, among the intra prediction methods for chroma channels, the co-channel prediction methods using the information on the same channel (②) include planar, DC, Horizontal, and Vertical modes. In addition, the co-channel prediction methods include technologies, such as ISP (Intra Sub Partition), MIP (Matrix-weighted Intra Prediction), and MRL (Multiple Reference Line). Further, a method of inferring a directional or non-directional mode from several reference lines around a current block and performing prediction may also be the co-channel prediction method. A method of calculating a weight based on a distance between a pixel in a corresponding luma region and a pixel around a corresponding block and then performing weighted sum on a pixel in a current chroma block and a neighboring chroma pixel using this weight and performing prediction may also be the co-channel prediction method.

Meanwhile, when the predictor of the chroma block is generated using information on the luma region corresponding to the chroma block as in the CCLM prediction, there is a problem that information on the neighboring pixels of the current chroma block is not used in a predictor generation process. This is because, in the related art, the predictor is generated using only one of the information on the corresponding luma region (①) and the information on the same channel (②). Further, according to a chroma channel sub-sampling scheme, there is a likelihood that the information on the corresponding luma region (①) is less important than the information on the same channel (②), as in neighboring pixels in a current channel Accordingly, discontinuity may occur between the predictor generated in the CCLM mode and adjacent neighboring pixels. This problem of the related art can be solved by considering information on the neighboring pixels of the current channel at the time of prediction according to the CCLM mode. This means that the prediction is performed using the information ②, in addition to the information ①. Alternatively, the problem of the related art can be solved by additionally using luma region information at the time of prediction using information on the neighboring pixels within the same channel (for example, at the time of directional or non-directional intra prediction). This means that the prediction is performed using the information ①, in addition to the information ②.

Figure 8:
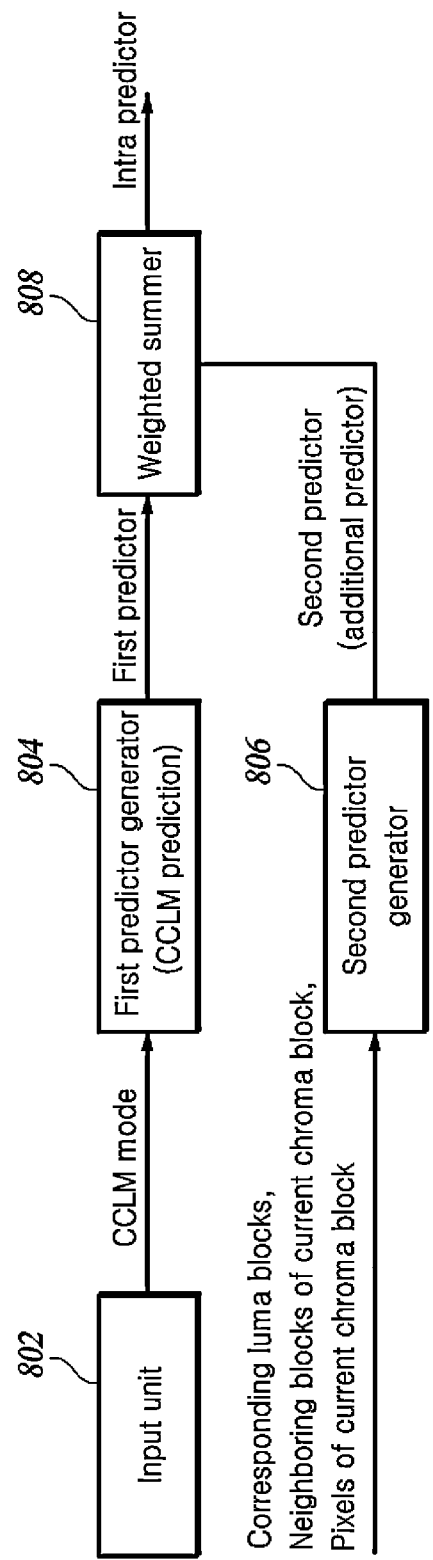
FIG. 8 is an illustrative diagram illustrating an intra predictor that performs intra prediction of a chroma block according to an embodiment of the present disclosure.

FIG. 8 is an illustrative diagram illustrating an intra predictor that performs the intra prediction of the chroma block according to an embodiment of the present disclosure.

In order to cope with a problem caused by using only one of the information on the corresponding luma region and the information on the same channel as described above, the intra predictor 542 in the video decoding apparatus according to the present embodiment performs weight combination on a first predictor based on the CCLM mode and a second predictor additionally generated based on the intra prediction mode to generate a predictor of the current chroma block. Here, the CCLM mode uses the information on the corresponding luma region (①), and the intra prediction mode uses the information on the same channel (②). The intra predictor 542 according to the present embodiment includes all or some of an input unit 802, a first predictor generator 804, a second predictor generator 806, and a weighted summer 808. Meanwhile, the intra predictor 122 in the video encoding apparatus may also include the same components.

The input unit 802 according to the present embodiment acquires a CCLM mode for CCLM prediction of the current chroma block. Alternatively, the input unit 802 may acquire a cross-component prediction mode for cross-component prediction of the current chroma block.

The first predictor generator 804 performs CCLM prediction based on the CCLM mode to generate a first predictor of the current chroma block. Alternatively, the first predictor generator 804 may perform cross-component prediction based on the cross-component prediction mode to generate the first predictor of the current chroma block.

The second predictor generator 806 generates the second predictor of the current chroma block based on the intra prediction mode using neighboring pixels. In other words, the second predictor generator 806 generates the second predictor based on the co-channel prediction mode using the same channel information.

The weighted summer 808 performs weighted combination on the first predictor and the second predictor using weights to generate an intra predictor of the current chroma block.

In this case, the video decoding apparatus may perform weighted combination on the first predictor and the second predictor using the weights as shown in Equation 3.

$$\text{pred}_C(i,j) = w_{CCLM}(i,j) \cdot \text{pred}_{CCLM}(i,j) + (1 - w_{CCLM}(i,j)) \cdot \text{pred}_{intra}(i,j) \quad \text{[Equation 3]}$$

Here, (i,j) represents the position of the pixel, and $\text{pred}_C(i,j)$ represents the intra predictor of the current chroma block. $\text{pred}_{CCLM}(i,j)$ represents the first predictor, $\text{pred}_{intra}(i,j)$ represents the second predictor, and $w_{CCLM}(i,j)$ represents the weight. As described above, $\text{pred}_{CCLM}(i,j)$ represents a predictor according to the CCLM prediction but may comprehensively represent a predictor according to the cross-component prediction.

Hereinafter, the second predictor and an 'additional predictor' are used interchangeably. When there are a plurality of additional predictors, another $\text{pred}_{intra}$ is added to Equation 3 and weights may also be divided and distributed for each additional predictor within $1 - w_{CCLM}(i,j)$.

Meanwhile, in Equation 3, the weight is expressed with reference to $w_{CCLM}$ but may be implemented based on $w_{intra}$ as in Equation 4 depending on the embodiment.

$$\text{pred}_C(i,j) = (1 - w_{intra}(i,j)) \cdot \text{pred}_{CCLM}(i,j) + w_{intra}(i,j) \cdot \text{pred}_{intra}(i,j) \quad \text{[Equation 4]}$$

The second predictor according to the co-channel prediction mode and the first predictor according to the CCLM mode may weighted and combined as shown in Equation 4. In Equation 4, a predictor according to the co-channel prediction mode may be referred to as a first predictor, and a predictor according to the CCLM mode may be referred to as a second predictor. In this case, similar to the illustration in FIG. 8, the intra prediction mode for generating the first predictor using the same channel information is parsed, and the CCLM mode for generating the second predictor using the information on the corresponding luma region is inferred. Therefore, it should be understood that the first predictor and the second predictor may include both the cases shown in Equation 3 and Equation 4 depending on the Examples.

Hereinafter, for convenience, unless otherwise specified, the predictor according to the CCLM mode is referred to as the first predictor, and the predictor according to the intra prediction mode using neighboring pixel information is referred to as the second predictor, and a weight expressed with reference to $w_{CCLM}$ shown in Equation 3 is used. Further, as illustrated in FIG. 8, the CCLM prediction mode for generating the first predictor may be parsed, and the intra prediction mode for generating the second predictor may be inferred.

The video decoding apparatus may infer an intra prediction mode using neighboring pixels by itself or may use the prediction mode transmitted on the bitstream by the video encoding apparatus. Further, the video decoding apparatus may infer a method of performing weighted combination on the first predictor and the second predictor by itself or may use a method transmitted on a bitstream by the video encoding apparatus. Methods for inferring/transmitting the intra prediction mode and methods for inferring/transmitting weights may be combined in various ways. For example, the intra prediction mode may be inferred by the video decoding apparatus, and the weighted combination method may be transmitted through a bitstream. On the other hand, the intra prediction mode may be transmitted through a bitstream and the weighted combination method may be inferred by the video decoding apparatus. Hereinafter, examples of these various combinations are described.

EXAMPLE 1

Inferring Method of Generating Predictors to Be Subject to Weighted Sum

The present example infers a method of generating a second predictor ($\text{pred}_{intra}$) using neighboring pixels of the same channel according to Equation 3. According to the present example, the video decoding apparatus may set a preset prediction mode as the prediction mode of the second predictor, without the prediction mode of the second predictor explicitly being signaled from the video encoding apparatus. Alternatively, the video decoding apparatus may infer at least one prediction mode of the second predictor based on information on at least one of a width/height/area/aspect ratio/prediction mode of the neighboring chroma blocks or a width/height/area/aspect ratio/prediction mode of the corresponding luma blocks. Here, the corresponding luma blocks are defined as blocks entirely or partially included in the corresponding luma region.

Meanwhile, when the present example follows Equation 4, the co-channel prediction mode for generating the intra predictor ($pred_{intra}$) may be parsed, and a method of generating the predictor ($pred_{CCLM}$) using information on the corresponding luma region may be inferred, as described above. According to the present example, the video decoding apparatus may set the preset prediction mode as the prediction mode of $pred_{CCLM}$, without the prediction mode of $pred_{CCLM}$ explicitly being signaled from the video encoding apparatus. Alternatively, the video decoding apparatus may infer at least one prediction mode of $pred_{CCLM}$ based on at least one piece of information among the width/height/area/aspect ratio/prediction mode of the neighboring chroma blocks.

Example 1-1

Setting Prediction Mode of Second Predictor to Predefined Prediction Mode

In the present example, according to Equation 3, the video decoding apparatus sets the prediction mode of the second predictor to a predefined prediction mode. In this case, available prediction modes may be modes in which a predictor is generated based on neighboring pixels, such as the 67 intra prediction modes (predModeIntra) illustrated in FIG. 3A, and an MIP (Matrix-weighted Intra Prediction) mode. For example, when one second predictor is used (i.e., when n is 1), the prediction mode of the second predictor may be the planar mode. Therefore, using Equation 3, the video decoding apparatus can generate the predictor of the current chroma block as shown in Equation 5.

$pred_C(i,j) = w_{CCLM}(i,j) \cdot pred_{CCLM}(i,j) + (1 - w_{CCLM}(i,j)) \cdot pred_{planar}$ [Equation 5]

As another example, when two additional predictors are used (i.e., when n is 2), the prediction modes of the respective additional predictors may be the planar mode and the DC mode. Accordingly, the video decoding apparatus can generate a predictor of the current chroma block as shown in Equation 6.

$pred_C(i,j) = w_{CCLM}(i,j) \cdot pred_{CCLM}(i,j) + (1 - w_{CCLM}(i,j)) \cdot \{w_1 \cdot pred_{planar} + w_2 \cdot pred_{DC}\}$ [Equation 6]

Here, the weights of additional predictors satisfy $w_1 + w_2 = 1$. In the case of the present example, the preset prediction mode is referred to as a 'representative mode', which is described below.

Meanwhile, when the present example follows Equation 4, the prediction mode of the predictor ($pred_{CCLM}$) using the information on the corresponding luma region may be preset. This mode may be at least one of the cross-component prediction modes described above. In this case, the co-channel prediction mode for generating a predictor using the same channel information may be parsed.

Example 1-2

Using Information From Blocks Neighboring the Current Chroma Block

In the present example, according to Equation 3, the video decoding apparatus sets the prediction mode of the second predictor to a prediction mode (hereinafter referred to as a 'representative mode') inferred using information, such as width/height/area/aspect ratio/prediction mode of the current chroma block and neighboring chroma blocks. In this case, the number of representative modes derived by the video decoding apparatus depends on the number of additional predictors to be subject to a weighted sum.

The video decoding apparatus may use one of the following five methods as a method for deriving the representative mode.

As a first method, the prediction mode of the block including a neighboring pixel at a specific position among the neighboring pixels of the current chroma block may be set as the representative mode. In this case, the specific position may be designated in various ways, as illustrated in FIG. 9.

Figure 9:
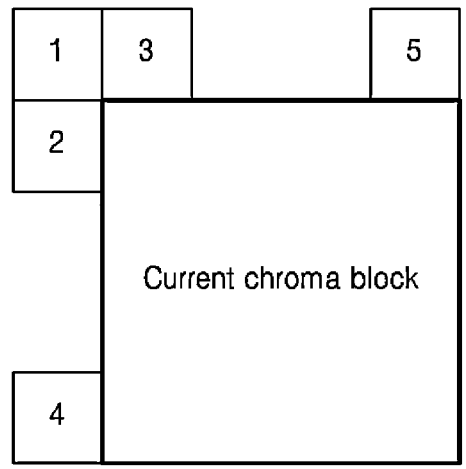
FIG. 9 is an illustrative diagram illustrating neighboring pixels at specific positions among the neighboring pixels of the current chroma block according to an embodiment of the present disclosure.
Figure 10:
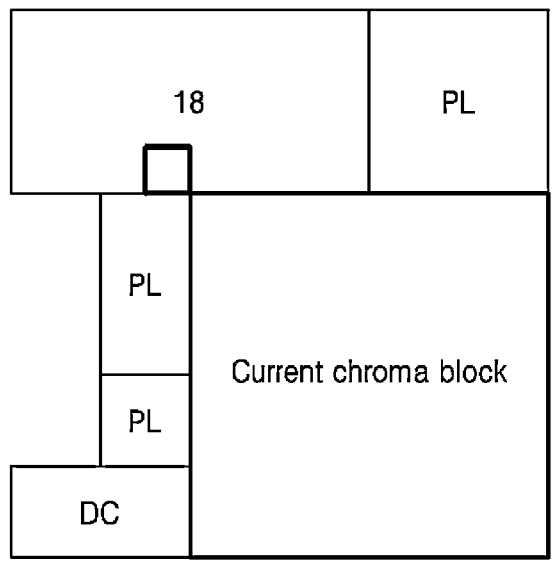
FIGS. 10-13 are illustrative diagrams illustrating a distribution and prediction modes of neighboring blocks of the current chroma block according to an embodiment of the present disclosure.

For example, a case in which the distribution and prediction modes of the neighboring blocks of the current chroma block are the same as in the example in FIG. 10 (in the following figures, a number in each block represent the prediction mode) is assumed. When the video decoding apparatus derives the representative mode based on the neighboring pixels located in an top left corner (a position with number 1 in the example of FIG. 9), a mode with number 18 may be used as the representative mode.

Figure 11:
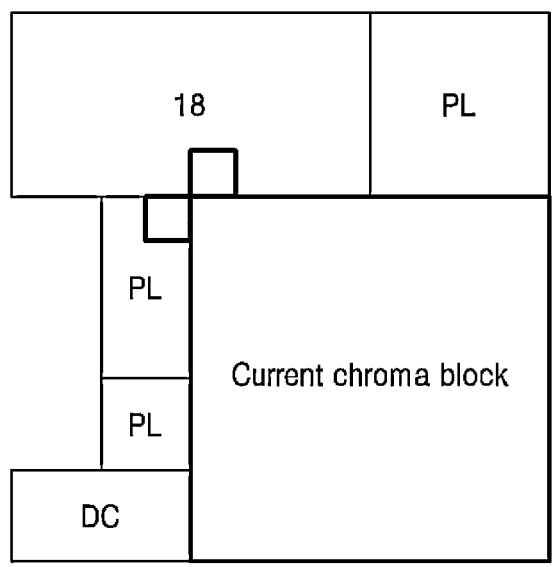

When a plurality of representative modes are inferred, the video decoding apparatus may select a plurality of pixels among the neighboring pixels of positions illustrated in FIG. 9. For example, a case in which the distribution and prediction modes of the neighboring blocks of the current chroma block are the same as in the example in FIG. 11 is assumed. When the representative modes are derived based on a left topmost neighboring pixel (a position with number 2 in the example of FIG. 9) and the top leftmost neighboring pixel (a position with number 3 in the example of FIG. 9), the video decoding apparatus may use the mode with number 18 and the planar (PL) mode used as representative modes.

As a second method, a most frequent prediction mode derived based on the number of blocks among the prediction modes of the blocks adjacent to the current chroma block may be set as the representative mode.

Figure 12:
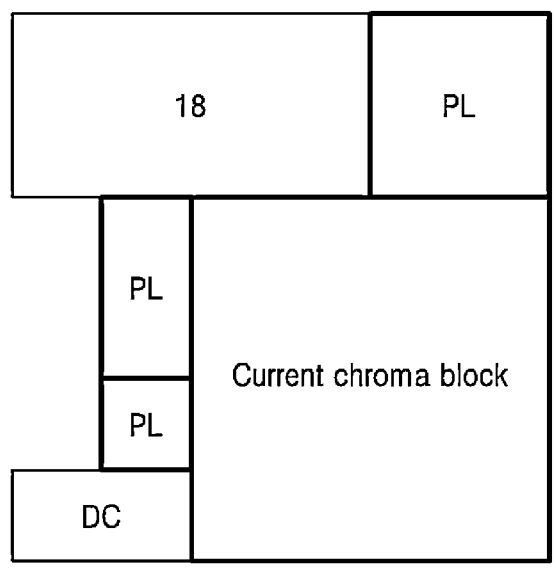

A case in which the distribution and prediction modes of the neighboring blocks of the current chroma block are the same as in the example in FIG. 12 is assumed. Since there are a total of five adjacent blocks and three of these use the planar mode, the video decoding apparatus uses the planar mode corresponding to the most frequent prediction mode, as the representative mode. When a plurality of representative modes are inferred, the representative modes may be derived in most frequent order. For example, when two representative modes are derived, the video decoding apparatus may infer the planar mode and the mode with number 18 (or the planar mode and the DC mode) together as representative modes.

When the frequencies of prediction modes are the same, priorities may be designated and the representative mode may be derived. In this case, a predetermined order such as a {planar, DC, horizontal direction mode, vertical direction mode, . . . } order, an ascending order, or a descending order may be used as the priority. Alternatively, when a block of the mode corresponding to the same frequency is closer to a top left end, a higher priority may be assigned.

For example, when the higher priority is assigned as the block in the corresponding mode is closer to the top left end, the block in the mode with number 18 has a higher priority than the block in the DC mode because the block in the mode with number 18 is closer to the top left end in the example of FIG. 12. Therefore, the video decoding apparatus may derive the planar mode and the mode with number 18 as representative modes.

When the frequencies of prediction modes are the same, the representative mode may be inferred according to a predefined rule, in addition to the above examples.

Figure 13:
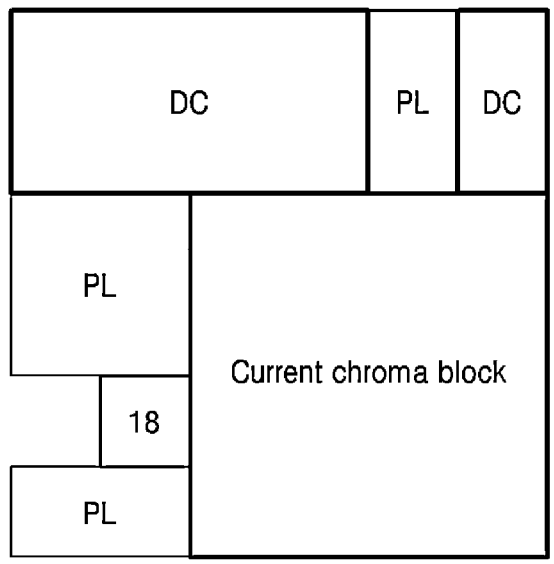

As another embodiment, when a plurality of representative modes are derived, adjacent blocks may be grouped, and then the most frequent mode may be derived in each group. In this case, the adjacent blocks may be spatially grouped as {left adjacent blocks} and {top adjacent blocks}. For example, a case in which the distribution and prediction modes of the neighboring blocks of the current chroma block are the same as in the example in FIG. 13 is assumed. Since two of the three blocks adjacent to the left side use the planar mode, the video decoding apparatus uses this as a first representative mode, and since two of the three blocks adjacent to the top use the DC mode, the video decoding apparatus uses this as a second representative mode.

As the third method, the most frequent prediction mode derived based on the block area among the prediction modes of the blocks adjacent to the current chroma block may be set as the representative mode.

The third method may be performed like a method using, as the representative mode, the most frequent prediction mode derived based on the number of blocks among the prediction modes of the adjacent blocks of the current chroma block, which is a second method. In short, in the third method, the most frequent mode is derived based on the area of adjacent blocks instead of the number of blocks.

Figure 14:
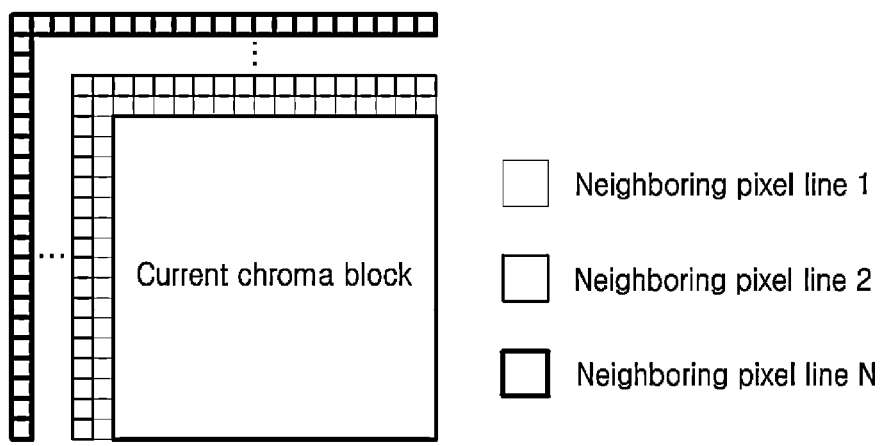
FIG. 14 is an illustrative diagram illustrating the neighboring pixels of the current chroma block.

As a fourth method, the most frequent prediction mode derived based on the prediction mode of the block including each neighboring pixel of the current chroma block may be set as the representative mode. In this case, neighboring pixels slightly distant from the current block as illustrated in the example of FIG. 14 may also be utilized, in addition to neighboring pixels simply immediately adjacent to the current block. Applications according to various combinations such as selection of only one of several neighboring pixel lines or selection of two or more lines are possible. Further, when the current block does not include neighboring pixels required in a process of generating a predictor, the neighboring pixels are generated using a method such as padding, and only the originally existing neighboring pixels other than the neighboring pixels created by padding may also be used.

Figure 15:
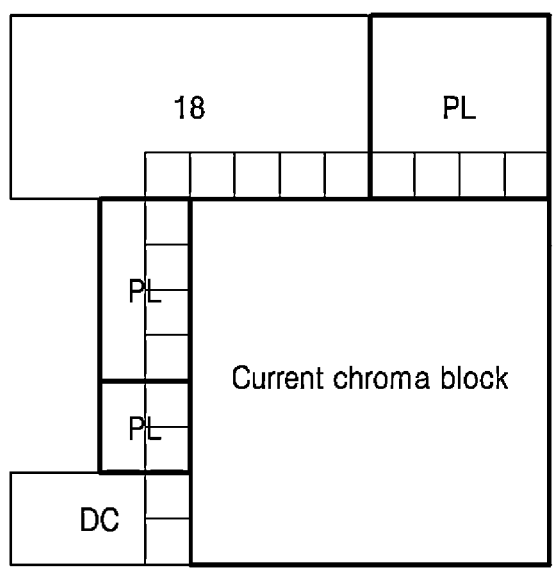
FIGS. 15 and 16 are illustrative diagrams illustrating neighboring pixel lines immediately adjacent to the current chroma block according to an embodiment of the present disclosure.

For example, a case in which only the neighboring pixel lines immediately adjacent to the current block are used as in the example of FIG. 15 is assumed. In the example of FIG. 15, since there are 10 pixels using the planar mode, which are a largest number of pixels, among 17 neighboring pixels including 16 neighboring pixels adjacent to the left side and top end of the current chroma block and one neighboring pixel at the top left end, the video decoding apparatus may use the planar mode as the representative mode. When the plurality of representative modes are inferred, the next most frequent prediction mode may be inferred based on the number of neighboring pixels and then may be used as another representative mode. In the example of FIG. 15, the mode with number 18 may be the second representative mode.

Figure 16:
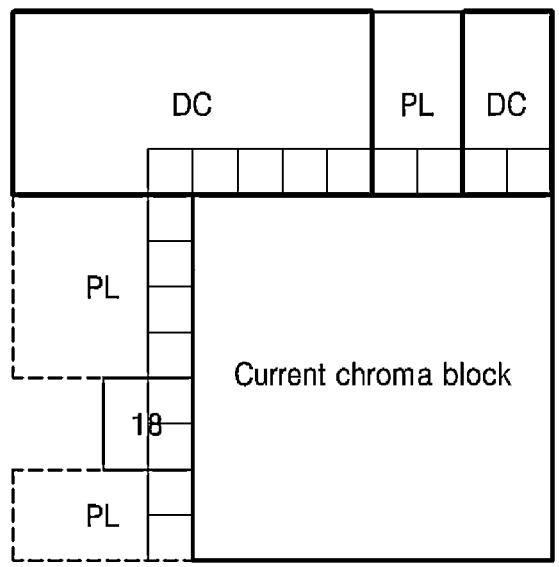

In addition to this method, as illustrated in FIG. 16, the video decoding apparatus may group the neighboring pixels adjacent to the left side and the top end of the current chroma block, may derive the most frequent mode of each group, and may use these as representative modes. In the present example, it is assumed that the neighboring pixels in the top left end are included in two groups at the same time. First, since there are six neighboring pixels in the planar mode, which are a largest number of pixels, among nine neighboring pixels adjacent to the left side of the current chroma block, the video decoding apparatus uses the planar mode as the first representative mode. Since there are seven neighboring pixels in the DC mode, which are a largest number of pixels, among nine neighboring pixels adjacent to the top end of the current chroma block, the video decoding apparatus may use the DC mode as the second representative mode.

Figure 17:
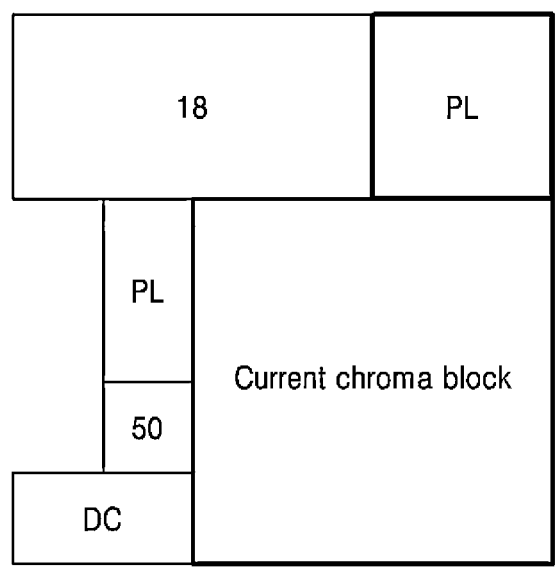
FIGS. 17 and 18 are illustrative diagrams illustrating a distribution and prediction modes of the neighboring blocks of the current chroma block according to another embodiment of the present disclosure.

As a fifth method, among the blocks adjacent to the current chroma block, the prediction mode of a block of which the aspect ratio is the same as (or most similar to) that of the current block may be set as the representative mode. For example, a case in which the distribution and prediction modes of the neighboring blocks of the current chroma block are the same as in the example in FIG. 17 is assumed. In the example of FIG. 17, there are the planar mode and the mode with number 50 as prediction modes of a block with the same aspect ratio as that of the current chroma block. When a plurality of prediction modes are derived, the video decoding apparatus uses a mode with a larger block size as the representative mode to select one representative mode. In the example of FIG. 17, the planar mode is set as the representative mode.

Figure 18:
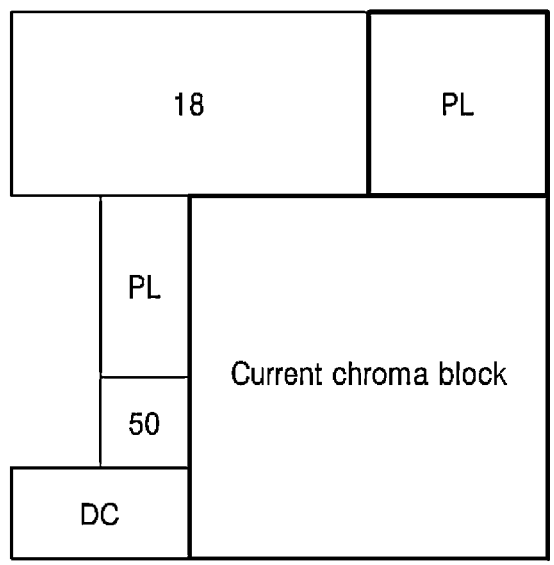

When a plurality of representative modes are inferred, the prediction mode of the adjacent block with the next highest aspect ratio similarity may be used as another representative mode. As another example, blocks with the aspect ratio most similar to that of the current block may be derived from blocks adjacent to the left of the current chroma block and blocks adjacent to the top of the current chroma block, and then each of the prediction modes used by the blocks may be used as the representative mode. For example, a case in which two representative modes are inferred as in the example of FIG. 18 is assumed. The video decoding apparatus may use, as representative modes, the mode with number 50, which is a prediction mode for the block with the same aspect ratio as the current block among the blocks adjacent to the left of the current chroma block, and the planar mode, which is a prediction mode for blocks with the same aspect ratio as the current block among the blocks adjacent to the top.

Hereinafter, an intra prediction method for a current chroma block using a weighted sum of the first predictor and the second predictor is described using the illustration of FIG. 19.

Figure 19:
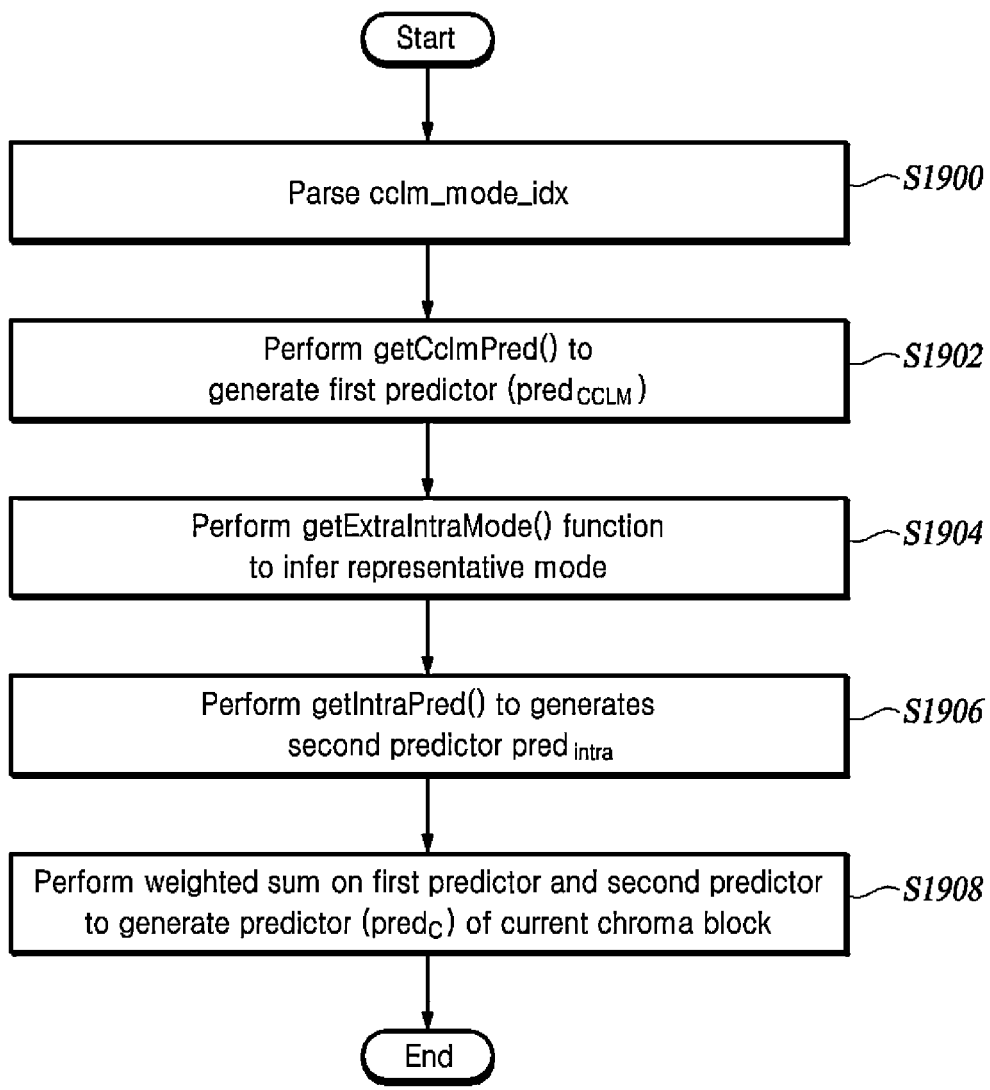
FIG. 19 is a flowchart illustrating an intra prediction method for a current chroma block according to an embodiment of the present disclosure.

FIG. 19 is a flowchart illustrating the intra prediction method for a current chroma block according to an embodiment of the present disclosure.

The video decoding apparatus parses cclm_mode_idx (S1900). The video decoding apparatus parses an index cclm_mode_idx to acquire the CCLM mode to be applied to the current chroma block. Alternatively, the video decoding apparatus may parse the index to acquire a cross-component prediction mode to be applied to the current chroma block.

The video decoding apparatus performs an existing getCclmPred( ) function with the parsed CCLM mode as an input to generate the first predictor (pred$_{CCLM}$) (S1902). Alternatively, the video decoding apparatus may generate the first predictor using the parsed cross-component prediction mode as an input.

The video decoding apparatus performs a getExtraIntraMode( ) function to infer the representative mode (S1904). Hereinafter, the getExtraIntraMode( ) function is referred to as a 'representative mode derivation function' or is simply referred to as a 'derivation function'.

The video decoding apparatus performs an existing getIntraPred( ) function with the representative mode as an input to generates a second predictor (pred$_{intra}$) (S1906).

The video decoding apparatus performs weighted sum on the first predictor and the second predictor to generate a predictor (pred$_C$) of the current chroma block (S1908).

In this case, a derivation function getExtraIntraMode( ) of inferring the representative mode may be implemented in various ways according to the five representative mode derivation methods of Example 1-2. Top left pixel coordinates (x0, y0), width, and height of the current chroma block may be provided as basic inputs to getExtraIntraMode( ) that implements the present example. In the case of the first method of Example 1-2, a relative coordinate value offset of the neighboring pixel to be referenced with reference to the coordinates of the top left pixel of the current block is additionally provided as an input.

Meanwhile, a getPU( ) function used within the derivation function is an existing function and receives the pixel coordinates and the channel information as inputs and returns information on the block including the pixel at a corresponding location.

Hereinafter, an operation of a derivation function getExtraIntraMode(x0, y0, width, height, offset) according to the first method of Example 1-2 is described.

The derivation function derives a position (xR, yR) of the neighboring pixel to be referenced, based on the coordinates (x0, y0) of the top left pixel of the current block and offset.

The derivation function inputs the (xR, yR) coordinates and the chroma channel to the getPU( ) function to generate information on the block and then outputs the prediction mode in the generated information as the representative mode.

Hereinafter, an operation of the derivation function getExtraIntraMode(x0, y0, width, height) according to the second method of Example 1-2 is described.

The derivation function searches for the position (xR, yR) of the neighboring pixel based on the coordinates (x0, y0) of the top left pixel, width, and height of the current block.

The derivation function inputs the (xR, yR) coordinates and the chroma channel to the getPU( ) function to generate information on the block and then derives the prediction mode in the generated information.

The derivation function adds the prediction mode to the 'prediction mode frequency list' when the previously searched neighboring pixel is included in a block different from that of currently searched neighboring pixel. The derivation function does not add the prediction mode to the 'prediction mode frequency list' when the previously searched neighboring pixel is included in the same block as that of the currently searched neighboring pixel.

The derivation function performs position search described above on all the neighboring pixels to complete the prediction mode frequency list.

The derivation function outputs the most frequent prediction mode among the prediction modes included in the prediction mode frequency list as the representative mode.

Hereinafter, an operation of the derivation function getExtraIntraMode(x0, y0, width, height) according to the third method of Example 1-2 is described.

The derivation function searches for the position (xR, yR) of the neighboring pixel based on the coordinates (x0, y0) of the top left pixel, width, and height of the current block.

The derivation function inputs the (xR, yR) coordinates and the chroma channel to the getPU( ) function to generate information on the block and then derives the prediction mode, width (wR), and height (hR) in the generated information.

The derivation function adds the wR×hR number of prediction modes to the 'prediction mode frequency list' when the previously searched neighboring pixel is included in the block different from that of the currently searched neighboring pixel. The derivation function does not add the prediction mode to the prediction mode frequency list when the previously searched neighboring pixel is included in the same block as that of the currently searched neighboring pixel.

The derivation function performs the position search described above on all the neighboring pixels to complete the prediction mode frequency list.

The derivation function outputs the most frequent prediction mode among the prediction modes included in the prediction mode frequency list as the representative mode.

Hereinafter, an operation of the derivation function getExtraIntraMode(x0, y0, width, height) according to the fourth method of Example 1-2 is described.

The derivation function searches for the position (xR, yR) of the neighboring pixel based on the coordinates (x0, y0) of the top left pixel, width, and height of the current block.

The derivation function inputs the (xR, yR) coordinates and the chroma channel to the getPU( ) function to generate information on the block and then adds the prediction mod in the generated information to the prediction mode frequency list.

The derivation function performs the position search described above on all the neighboring pixels to complete the prediction mode frequency list.

The derivation function outputs the most frequent prediction mode among the prediction modes included in the prediction mode frequency list as the representative mode.

Hereinafter, an operation of the derivation function getExtraIntraMode(x0, y0, width, height) according to the fifth method of Example 1-2 is described.

The derivation function uses the width and the height to calculate the aspect ratio of the current block.

The derivation function searches for the position (xR, yR) of the neighboring pixel based on the coordinates (x0, y0) of the top left pixel, width, and height of the current block.

The derivation function inputs the (xR, yR) coordinates and the chroma channel to the getPU( ) function to generate information on the block, and then derives the prediction mode, width (wR), and height (hR) in the generated information and calculates the aspect ratio of the block using the width (wR) and height (hR).

The derivation function adds the prediction mode and the calculated aspect ratio pair to an 'aspect ratio similarity list' when the previously searched neighboring pixel is included in the block different from that of the currently searched neighboring pixel. The derivation function does not add the prediction mode and the calculated aspect ratio pair to the aspect ratio similarity list when the previously searched neighboring pixel is included in the same block as that of the currently searched neighboring pixel.

The derivation function performs this position search on all the neighboring pixels to complete the aspect ratio similarity list.

The derivation function outputs a prediction mode of an element pair with the highest similarity to the aspect ratio of the current block as the representative mode with reference to respective aspect ratios for the element pairs included in the aspect ratio similarity list. For example, there are seven types of aspect ratios including {8, 4, 2, 1, 1/2, 1/4, 1, and 8}, and the similarity may be regarded as being high as an absolute value of an index difference between two aspect ratios in such a list is smaller.

An operation of the derivation function getExtraIntraMode( ) as described above for the five types of representative mode derivation methods describes a case in which one representative mode is generated. When a plurality of representative modes are generated, the derivation function can be expanded by additionally inputting the number of representative modes numExtraMode.

Meanwhile, when the present realization example follows Equation 4, the prediction mode of the predictor ($pred_{CCLM}$) may be inferred using information on the current chroma block and neighboring chroma blocks. Here, the prediction mode may be at least one of the cross component prediction modes described above. For example, a prediction mode of a block including a neighboring pixel located at a specific position among the neighboring pixels of the current chroma block may be set to the representative mode. Among the prediction modes of the blocks adjacent to the current chroma block, the most frequent prediction mode derived based on the number of blocks may be set as the representative mode. Among the prediction modes of the blocks adjacent to the current chroma block, the most frequent prediction mode derived based on the block area may be set as the representative mode. The most frequent prediction mode derived based on the prediction mode of the block including each neighboring pixel of the current chroma block may be set as the representative mode. Further, the representative mode may be inferred according to the aspect ratio of the current chroma block. Thereafter, the inferred representative mode may be set as the prediction mode of the predictor ($pred_{CCLM}$).

Example 1-3

Using Information on Blocks Included in Corresponding Luma Region

In the present example, according to Equation 3, the video decoding apparatus sets a prediction mode (hereinafter referred to as a 'representative mode') inferred using information such as width/height/area/aspect ratio/prediction mode of the block included in the luma region corresponding to the current chroma block (hereinafter, a 'corresponding luma region') as the prediction mode of the second predictor. In this case, the number of representative modes derived by the video decoding apparatus depends on the number of second predictors that are subject to a weighted sum.

The video decoding apparatus may use one of the following four methods as a method for deriving the representative mode.

As a first method, a prediction mode of a block including a pixel at a specific position among the pixels in the corresponding luma region may be set as the representative mode. In this case, the specific position may be designated in various ways, as in the example of FIG. 20.

Figure 20:
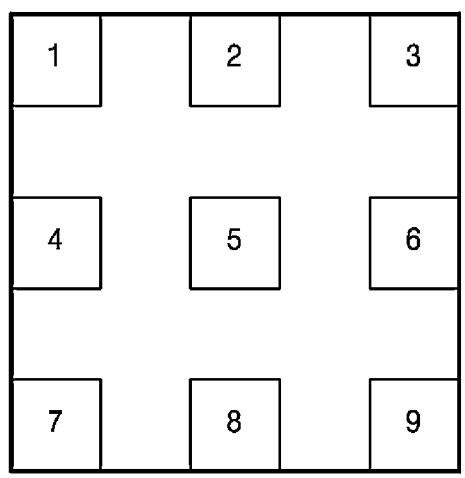
FIG. 20 is an illustrative diagram illustrating pixels at specific positions among the pixels in a corresponding luma region according to an embodiment of the present disclosure.
Figure 21:
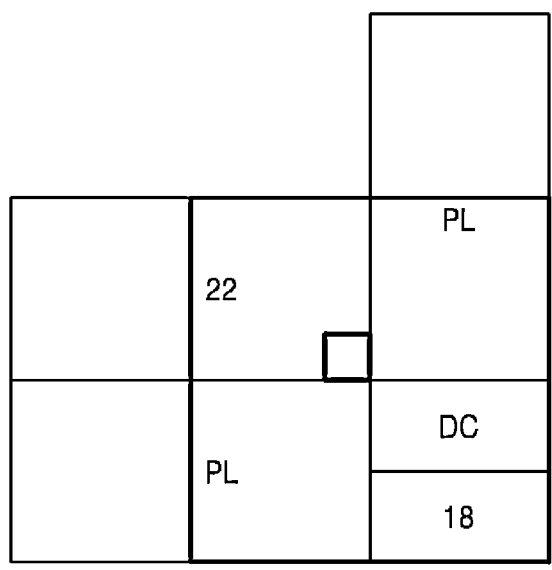
FIGS. 21-24 are illustrative diagrams illustrating a distribution of the blocks included in the corresponding luma region and prediction modes according to an embodiment of the present disclosure.

For example, a case in which the distribution and prediction modes of the blocks included in the corresponding luma region are the same as in the example in FIG. 21 is assumed. When the video decoding apparatus derives the representative mode based on a pixel located in an exact center (a position with number 5 in the example of FIG. 20), the mode with number 22 may be used as the representative mode.

Figure 22:
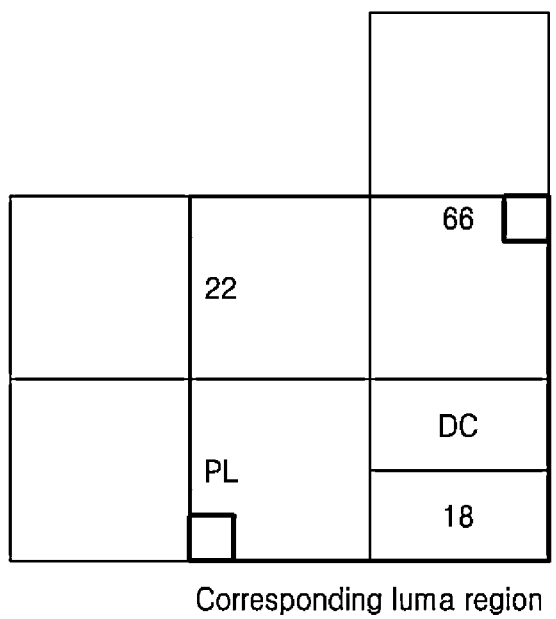

When a plurality of representative modes are inferred, the video decoding apparatus may select a plurality of pixels from among the pixels at the positions illustrated in FIG. 20. As in the example of FIG. 22, the prediction mode of blocks including pixels located at an top right end and a bottom left among the pixels in the corresponding luma region may be used as the representative mode. Therefore, the video decoding apparatus uses the mode with number 66, which is the prediction mode of the block including the pixel located at the top right (a position with number 3 in the example of FIG. 20), as the first representative mode, and uses the planar mode, which is the prediction mode of the block including the pixel located at the bottom left (a position with number 7 in the example of FIG. 20), as the second representative mode.

As a second method, the most frequent prediction mode derived based on the number of blocks among the prediction modes of the blocks included in the corresponding luma region may be set as the representative mode.

Figure 23:
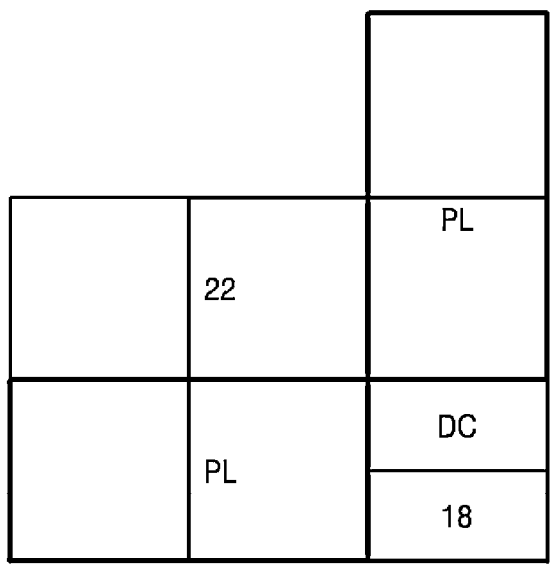

A case in which the distribution and prediction modes of the blocks included in the corresponding luma region are the same as in the example in FIG. 23 is assumed. Since there are a total of 5 blocks in the corresponding luma region, and two of these blocks use the planar mode, the video decoding apparatus uses the planar mode as the representative mode. When a plurality of representative modes are inferred, the video decoding apparatus may use the prediction mode used by the second most blocks in the example of FIG. 23 as another representative mode.

When the frequencies of prediction modes are the same, priorities may be designated and the representative mode may be derived. In this case, a predetermined order such as a {planar, DC, horizontal direction mode, vertical direction mode, . . . } order, an ascending order, or a descending order may be used as the priority. Alternatively, when a block of the mode corresponding to the same frequency has a larger area, a higher priority may be assigned.

For example, when the higher priority is assigned as the block in the corresponding mode occupies a larger area within the corresponding luma region, the block in the mode with number 22 has a higher priority than the block in the DC mode and the mode with number 18 because the block in the mode with number 22 occupies a larger area within the luma region in the example of FIG. 23. Therefore, the video decoding apparatus may derive the planar mode and the mode with number 22 as representative modes.

When the frequencies of prediction modes are the same, the representative mode may be inferred according to a predefined rule, in addition to the above examples.

As the third method, the most frequent prediction mode derived based on the block area among the prediction modes of the blocks included in the corresponding luma region may be set as the representative mode.

The third method may be performed in the same way as a method of using the most frequent prediction mode derived based on the number of blocks among the prediction modes of the blocks included in the corresponding luma region as the representative mode, which is the second method. In the third method, the most frequent mode is derived based on the areas of the blocks included in the corresponding luma region instead of the number of blocks.

Figure 24:
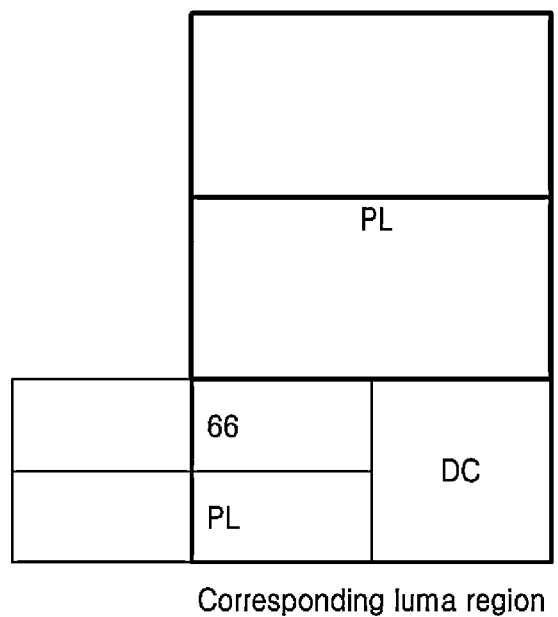

As the fourth method, the prediction mode of the block whose aspect ratio is the same as (or most similar to) that of the current block among the blocks included in the corresponding luma region may be set as the representative mode. For example, a case in which the distribution and prediction modes of the blocks included in the corresponding luma region are the same as in the example in FIG. 24 is assumed. In the example of FIG. 24, there are the planar mode and the DC mode as prediction modes of the block with the same aspect ratio as that of the current chroma block. When a plurality of prediction modes are derived, the video decoding apparatus uses the mode with a larger block size as the representative mode to select one representative mode. In the example of FIG. 24, the planar mode is set as the representative mode.

When a plurality of representative modes are inferred, a prediction mode of a block with the next highest aspect ratio similarity may be used as another representative mode. In the example of FIG. 24, the video decoding apparatus may use the planar mode and the DC mode as the representative modes.

Each representative mode derivation method according to Example 1-3 as described above may be included as part of the intra prediction method as illustrated in FIG. 19. In this case, getExtraIntraMode( ) in which the representative mode is inferred according to the four representative mode derivation methods of Example 1-3 can be implemented in various ways. Top left pixel coordinates (x0, y0), width, and height of the current chroma block may be provided as basic inputs to the derivation function getExtraIntraMode( ) that implements the present example. In the case of the first method of Example 1-3, a relative coordinate value offset of the pixel position to be referenced with reference to the coordinates of the luma pixel corresponding to the coordinates of the top left pixel of the current chroma block is additionally provided as an input.

The getPU( ) function used within the derivation function is an existing function, and receives the pixel coordinates and the channel information as inputs and returns information on the block including the pixel at a corresponding position. The getColocPos( ) function is an existing function, receives the pixel coordinates, current channel information, and corresponding channel information as inputs, and returns the corresponding position within the corresponding channel for the pixel within the current channel. Further, a getColocLen( ) function is an existing function, receives a width/height of the block, the current channel information, and the corresponding channel information as inputs, and returns a length within the corresponding channel for the width/height of the current channel Hereinafter, an operation of the derivation function getExtraIntraMode(x0, y0, width, height, offset) according to the first method of Example 1-3 is described.

The derivation function receives the coordinates (x0, y0) of the top left pixel of the current block, the current channel as the chroma channel, and the corresponding channel as a luma channel and derives the coordinates (x0L, y0L) of the corresponding luma pixel.

The derivation function derives the position (xR, yR) of the pixel to be referenced, based on (x0L, y0L) and the offset.

The derivation function inputs the (xR, yR) coordinates and the luma channel to the getPU( ) function to generate information on the block and then outputs the prediction mode in the generated information as the representative mode.

Hereinafter, an operation of the derivation function getExtraIntraMode(x0, y0, width, height) according to the second method of Example 1-3 is described.

The derivation function receives the coordinates (x0, y0) of the top left pixel of the current block, the current channel as the chroma channel, and the corresponding channel as the luma channel and derives the coordinates (x0L, y0L) of the corresponding luma pixel.

The derivation function receives the width or height of the current block, the current channel as the chroma channel, and the corresponding channel as the luma channel and derives lengths widthL and heightL in the corresponding luma channel.

The derivation function searches for the positions (xR, yR) of the corresponding luma region pixels based on (x0L, y0L), widthL, and heightL.

The derivation function inputs the (xR, yR) coordinates and the chroma channel to the getPU( ) function to generate information on the block and then derives the prediction mode in the generated information.

The derivation function adds the prediction mode to the 'prediction mode frequency list' when the previously searched pixel is included in a block different from that of the currently searched pixel. The derivation function does not add the prediction mode to the 'prediction mode frequency list' when the previously searched pixel is included in the same block as that of the currently searched pixel.

The derivation function performs the position search as described above on all the pixels in the corresponding luma region to complete the prediction mode frequency list.

The derivation function outputs the most frequent prediction mode among the prediction modes included in the prediction mode frequency list as the representative mode.

Hereinafter, an operation of the derivation function getExtraIntraMode(x0, y0, width, height) according to the third method of Example 1-3 is described.

The derivation function receives the coordinates (x0, y0) of the top left pixel of the current block, the current channel as the chroma channel, and the corresponding channel as the luma channel and derives the coordinates (x0L, y0L) of the corresponding luma pixel.

The derivation function receives the width or height of the current block, the current channel as the chroma channel, and the corresponding channel as the luma channel and derives lengths widthL and heightL in the corresponding luma channel.

The derivation function searches for the positions (xR, yR) of the corresponding luma region pixels based on (x0L, y0L), widthL, and heightL.

The derivation function inputs the (xR, yR) coordinates and the luma channel to the getPU( ) function to generate information on the block and then derives the prediction mode, width (wR), and height (hR) in the generated information.

The derivation function adds the wR×hR number of prediction modes to the 'prediction mode frequency list' when the previously searched pixel is included in the block different from that of the currently searched pixel. The derivation function does not add the prediction mode to the prediction mode frequency list when the previously searched pixel is included in the same block as that of the currently searched pixel.

The derivation function performs the position search as described above on all the pixels in the corresponding luma region to complete the prediction mode frequency list.

The derivation function outputs the most frequent prediction mode among the prediction modes included in the prediction mode frequency list as the representative mode.

Hereinafter, an operation of the derivation function getExtraIntraMode(x0, y0, width, height) according to the fourth method of Example 1-3 is described.

The derivation function uses the width and the height to calculate the aspect ratio of the current block.

The derivation function receives the coordinates (x0, y0) of the top left pixel of the current block, the current channel as the chroma channel, and the corresponding channel as the luma channel and derives the coordinates (x0L, y0L) of the corresponding luma pixel.

The derivation function receives the width or height of the current block, the current channel as the chroma channel, and the corresponding channel as the luma channel and derives the lengths widthL and heightL in the corresponding luma channel.

The derivation function searches for the positions (xR, yR) of the corresponding luma region pixels based on (x0L, y0L), widthL, and heightL.

The derivation function inputs the (xR, yR) coordinates and the luma channel to the getPU( ) function to generate information on the block and then derives the prediction mode, width (wR), and height (hR) in the generated information and calculates the aspect ratio of the block using the (wR) and the height (hR).

The derivation function adds the prediction mode and the calculated aspect ratio pair to the 'aspect ratio frequency list' when the previously searched pixel is included in a block different from that of the currently searched pixel. The derivation function does not add the prediction mode and the calculated aspect ratio pair to the aspect ratio frequency list when the previously searched pixel is included in the same block as that of the currently searched pixel.

The derivation function performs the position search described above on all the pixels in the corresponding luma region to complete the aspect ratio frequency list.

The derivation function outputs a prediction mode of an element pair with the highest similarity to the aspect ratio of the current block as the representative mode with reference to respective aspect ratios for the element pairs included in the aspect ratio similarity list. For example, there are seven types of aspect ratios including {8, 4, 2, 1, 1/2, 1/4, 1, and 8}, and the similarity may be regarded as being high as an absolute value of an index difference between two aspect ratios in such a list is smaller.

An operation of the derivation function getExtraIntraMode as described above for the four types of representative mode derivation methods describes a case in which one representative mode is generated. When a plurality of representative modes are generated, the derivation function can be expanded by additionally inputting the number of representative modes numExtraMode.

Example 1-4

Combination of Example 1-1, Example 1-2 and Example 1-3

In the present example, according to Equation 3, when the video decoding apparatus generates a plurality of second predictors, the video decoding apparatus may select and use one of the methods presented in Example 1-1, Example 1-2, and Example 1-3 to infer the prediction mode for generating each second predictor (hereinafter referred to as a 'representative mode'). In the above-described examples, a method of simultaneously inferring a plurality of representative modes using one specific method within each example has already been described. In the present example, the video decoding apparatus may infer the representative modes using different methods when generating each second predictor.

For example, when the video decoding apparatus generates two additional predictors, the video decoding apparatus may infer the first representative mode using Example 1-1 and may infer the second representative mode using Example 1-2. Alternatively, the first representative mode is inferred based on the second method in Example 1-2 (a method of deriving the most frequent prediction mode based on the number of adjacent blocks), and the second representative mode is inferred based on the third methods in Example 1-2 (a method of deriving the most frequent prediction mode based on the areas of adjacent blocks). As other examples, there may be various combinations of inference methods, and as the number of additional predictors increases, more various combinations of inference methods may be used.

EXAMPLE 2

Method of Setting Weights for Weighted Combination

In the present example, a method of performing weighted combination on the second predictor generated based on the representative mode inferred according to Example 1 and the first predictor generated according to existing CCLM prediction, based on Equation 3 is described. For the weighted combination, the video decoding apparatus may consider at least one of a pixel position and width/height/area/prediction mode in the current block, a width/height/area/prediction mode of the neighboring block, or a width/height/area/prediction mode of the corresponding luma blocks.

The video decoding apparatus can implement various weighted combination methods by appropriately setting w(i, j) in Equation 3. Hereinafter, weighted combination methods when there is one second predictor (predictor according to the information on the same channel (②)), basically, in addition to the first predictor (predictor according to the information on the corresponding luma region (①)) generated in an existing CCLM mode are described. The same methods can also be applied to a case in which there are the plurality of additional predictors.

Hereinafter, Examples 2-1 to 2-3 are methods of setting the same weight for all pixels in the predictor. The weighted combination method for the corresponding example is described without considering an influence of pixel coordinates (i, j) in the predictor, as shown in Equation 7.

$$\text{pred}_C = w_{CCLM} \cdot \text{pred}_{CCLM} + (1 - w_{CCLM}) \cdot \text{pred}_{intra} \quad \text{[Equation 7]}$$

Since Example 2-4 are a method of setting weights differently depending on the pixel coordinates (i, j) in the predictor, Example 2-4 is described using an expression of Equation 3.

Meanwhile, the above can also be equally applied to the example using Equation 4.

Example 2-1

Using Predefined Weight

In the present example, the video decoding apparatus uses a predefined weight $w_{CCLM}$ according to Equation 3. In this case, equal weights, a greater weight for CCLM prediction (3:1, 7:1, . . . ), or a smaller weight for CCLM prediction (1:3, 1:7, . . . ) may be used as the predefined weight.

For example, the video decoding apparatus may set equal weights for all the predictors, as shown in Equation 8.

$$pred_C = \frac{1}{2} \cdot pred_{CCLM} + \frac{1}{2} \cdot pred_{intra}, \left(w_{CCLM} = \frac{1}{2}\right) \quad \text{[Equation 8]}$$

Alternatively, as shown in Equation 9, the video decoding apparatus may set a higher weight to the first predictor according to the CCLM prediction.

$$pred_C = \frac{3}{4} \cdot pred_{CCLM} + \frac{1}{4} \cdot pred_{intra}, \left(w_{CCLM} = \frac{3}{4}\right) \quad \text{[Equation 9]}$$

Example 2-2

Using Information From Neighboring Blocks of Current Chroma Block

In the present example, according to Equation 3, the video decoding apparatus sets the weights using information such as width/height/area/prediction mode of the neighboring blocks adjacent to the current chroma block. In general, there may be a correlation between the current block and adjacent blocks. Accordingly, a correlation between the current block and the adjacent blocks using the prediction mode (hereinafter referred to as 'representative mode') for generating the second predictor may be converted into a numerical value. Hereinafter, the correlation converted into a numerical value is referred to as a neighboring pixel correlation $r_C$. The video decoding apparatus may set a value of the weight $w_{CCLM}$ using the neighboring pixel correlation $r_C$.

The video decoding apparatus may use one of the following three methods as a method of deriving the neighboring pixel correlation $r_C$.

As a first method, a ratio of the adjacent blocks using the representative mode among the blocks adjacent to the current block may be calculated based on the number of blocks and $r_C$ may be derived.

For example, a ratio of the number of the adjacent blocks using the representative mode to a total number of the neighboring blocks adjacent to the current chroma block may be calculated, and then this ratio may be set to $r_C$. The video decoding apparatus may use this ratio as the weight of the second predictor and set a value obtained by subtracting the ratio from 1 as the weight of the first predictor generated in the CCLM mode, as shown in Equation 10.

$$pred_C = w_{CCLM} \cdot pred_{CCLM} + (1 - w_{CCLM}) \cdot pred_{intra}, \quad \text{[Equation 10]}$$
$$\left(r_C = 1 - w_{CCLM} = \frac{\text{number of blocks using representative mode}}{\text{number of all adjacent blocks}}\right)$$

Figure 25:
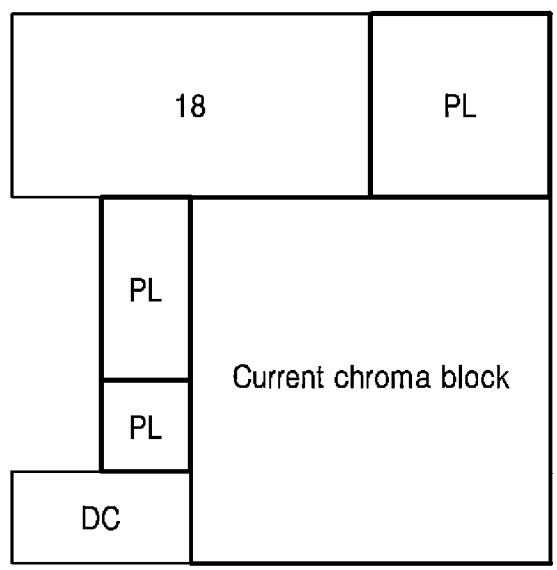
FIGS. 25-27 are illustrative diagrams illustrating a distribution and prediction modes of the neighboring blocks of the current chroma block according to another embodiment of the present disclosure.

A case in which the block distribution and prediction modes of the blocks adjacent to the current chroma block are the same as in the example in FIG. 25 is assumed. In the example of FIG. 25, there are a total of five blocks adjacent to the current chroma block, and three of these adjacent blocks use the planar mode that is the representative mode.

Therefore, the video decoding apparatus may set 3/5 as the weight of the second predictor and 2/5 as the weight of the first predictor generated in the CCLM mode according to Equation 10. When the plurality of additional predictors is subject to a weighted combination, the weight of each additional predictor may be calculated in the same way, and then the video decoding apparatus may set a value obtained by subtracting the sum of the weights of the additional predictors from 1 as the weight of the first predictor.

Meanwhile, the video decoding apparatus may refer to only a plurality of specific positions without referring to all the neighboring blocks adjacent to the current chroma block, instead of the method of calculating the number of the adjacent blocks using the representative mode as described above. For example, in the example of FIG. 9, when only the pixels at two positions (a left bottommost neighboring pixel located at number 4 and an top rightmost neighboring pixel located at number 5) are referenced, the weight may be set as 1:3, 2:2, and 3:1 according to the number of representative modes. In other words, when the number of representative modes is larger, a higher weight is set for the predictor that selects the representative mode. A case in which the block distribution and prediction modes of the blocks adjacent to the current chroma block are as illustrated in FIG. 25 is assumed. When the representative mode is the planar mode, the representative mode is present at one of the two positions. Accordingly, the video decoding apparatus may set 2/4 as the weight of the second predictor and set the same value, 2/4, as the weight of the first predictor generated in the CCLM mode. When the representative mode is the Vertical mode (the mode with number 50), the representative mode is not present in the two positions. Accordingly, the video decoding apparatus may set the small value, 1/4, as the weight of the second predictor and the great value, 3/4, as the weight of the first predictor generated in the CCLM mode.

As a second method, the ratio of the adjacent blocks using the representative mode among the blocks adjacent to the current block may be calculated based on the block area and $r_C$ may be derived.

For example, a ratio of an area of the adjacent blocks using the representative mode to a total area of the neighboring blocks adjacent to the current chroma block may be calculated and then may be set to $r_C$. The video decoding apparatus may use this ratio as the weight of the second predictor and may set a value obtained by subtracting the ratio from 1 as the weight of the first predictor generated in the CCLM mode, as shown in Equation 11.

$$pred_C = w_{CCLM} \cdot pred_{CCLM} + (1 - w_{CCLM}) \cdot pred_{intra}, \quad \text{[Equation 11]}$$
$$\left(r_C = 1 - w_{CCLM} = \frac{\text{area of blocks using representative mode}}{\text{area of all adjacent blocks}}\right)$$

Figure 26:
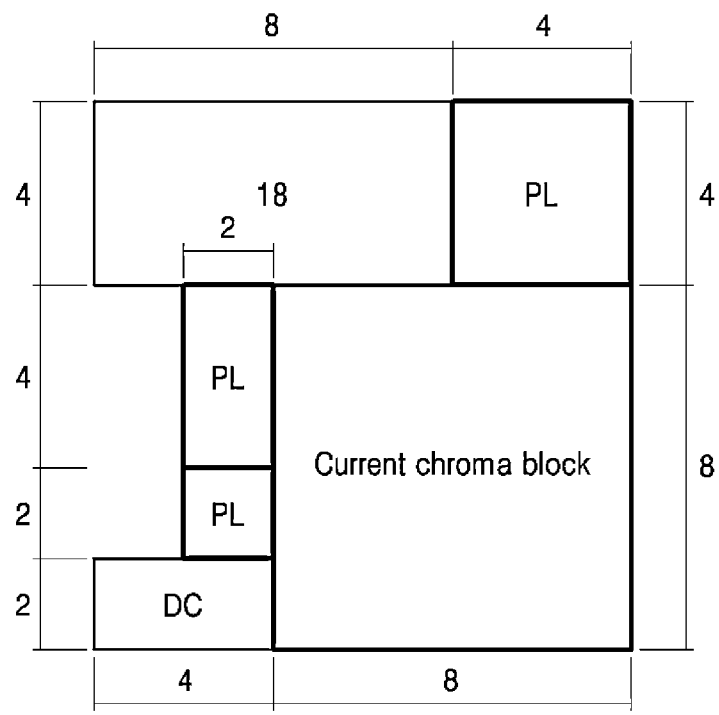

A case in which the block distribution and prediction modes of the blocks adjacent to the current chroma block are the same as in the example in FIG. 26 is assumed. In the example of FIG. 26, a total area of the blocks adjacent to the current chroma block is 68, and an area of adjacent blocks using the planar mode, which is the representative mode among the total area, is 28. Therefore, the video protection device may set 28/68 as the weight of the second predictor and 40/68 as the weight of the first predictor generated in the CCLM mode according to Equation 11. When the plurality of additional predictors is subject to a weighted combination, the weight of each additional predictor may be calculated in the same way, and then the video decoding apparatus may set the value obtained by subtracting the sum of the weights of the additional predictors from 1 as the weight of the first predictor.

As the third method, $r_C$ may be derived based on a ratio of a length of the sides of the adjacent blocks using the representative mode adjacent to the current block to a length of entire side of the current chroma block adjacent to the neighboring adjacent blocks.

For example, a ratio of a length of a side of the adjacent blocks using the representative mode adjacent to the current chroma block to a length of entire side of the current chroma block adjacent to the neighboring adjacent blocks may be calculated and then may be set to $r_C$. The video decoding apparatus may use this ratio as the weight of the second predictor and may set a value obtained by subtracting the ratio from 1 as the weight of the first predictor generated in the CCLM mode, as shown in Equation 12.

$$pred_C = w_{CCLM} \cdot pred_{CCLM} + (1 - w_{CCLM}) \cdot pred_{intra}, \quad \text{[Equation 12]}$$

$$\left( r_C = 1 - w_{CCLM} = \frac{\text{length of adjacent sides of blocks using representative mode}}{\text{length of all adjacent sides of current block}} \right)$$

Figure 27:
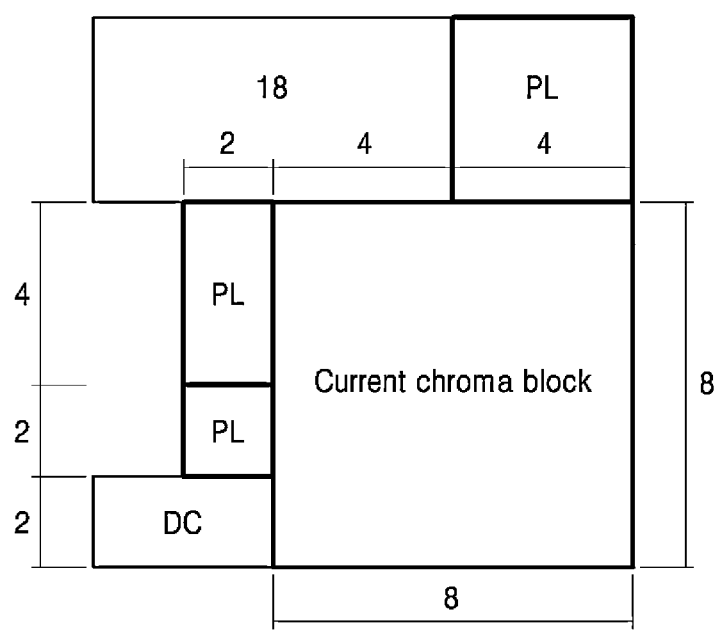

A case in which the block distribution and prediction modes of the blocks adjacent to the current chroma block are the same as in the example in FIG. 27 is assumed. In the example of FIG. 27, a total length of the sides of the adjacent blocks adjacent to the current chroma block is 16, and a length of the sides of the adjacent blocks using the planar mode, which is a representative mode adjacent to the current chroma block, is 10. Therefore, the 20 video decoding apparatus may set 10/16 as the weight of the second predictor and 6/16 as the weight of the first predictor generated in the CCLM mode according to Equation 12. When the plurality of additional predictors is subject to a weighted combination, the weight of each additional predictor may be calculated in the same way, and then the video decoding apparatus may set the value obtained by subtracting the sum of the weights of the additional predictors from 1 as the weight of the first predictor.

In the present example, when the number of all the adjacent blocks or an area of all the adjacent blocks is not in the form of a power of 2 in a process of calculating the neighboring pixel correlation $r_C$, and this is implemented in hardware, computational complexity may greatly increase in a division process. Therefore, the video decoding apparatus may approximate each denominator and numerator in the form of a power of 2 using an operation shown in Equation 13 and then may derive the neighboring pixel correlation using Equations 10 to 12 in a process of deriving the neighboring pixel correlation.

number of approximated adjacent blocks=1«Round (log$_2$ Number of adjacent blocks)

area of approximated adjacent blocks =1«Round(log$_2$ area of adjacent blocks) [Equation 13]

Meanwhile, when the present example follows Equation 4, the neighboring pixel correlation $r_C$ (=1–$w_{intra}$) of the predictor (pred$_{CCLM}$) may be inferred using the prediction mode for generating the predictor (pred$_{CCLM}$) of the current chroma block (hereinafter referred to as a 'representative mode') and using information on the neighboring blocks adjacent to the current chroma block. Here, the prediction mode of the current chroma block and each neighboring block may be the cross-component prediction mode as described above. For example, the ratio of the adjacent blocks using the representative mode among the blocks adjacent to the current block may be calculated based on the number of blocks and $r_C$ may be derived. The ratio of the adjacent blocks using the representative mode among the blocks adjacent to the current block may be calculated based on the block area and $r_C$ may be derived. Further, $r_C$ may be derived based on a ratio of a length of the sides of the adjacent blocks using the representative mode adjacent to the current block to a length of entire side of the current chroma block adjacent to the neighboring adjacent blocks. Thereafter, the correlation of the neighboring pixels may be set as a weight of the predictor (pred$_{CCLM}$).

Example 2-3

Using Information on Blocks Included in Corresponding Luma Region

In the present example, according to Equation 3, the video decoding apparatus uses information such as width/height/area/prediction mode of blocks included in the luma region corresponding to the current chroma block (hereinafter, a 'corresponding luma region') to set the weight. There may be a certain correlation between the current chroma block and the corresponding luma region. Accordingly, a correlation between blocks in a region using the prediction mode for generation of the second predictor (hereinafter referred to as a 'representative mode') and the current chroma block can be converted into a numerical value. Hereinafter, the correlation converted into a numerical value is referred to as a luma pixel correlation $r_L$. The video decoding apparatus may set the value of the weight $w_{CCLM}$ using the luma pixel correlation $r_L$.

The video decoding apparatus may use one of the following two methods as methods of deriving the luma pixel correlation $r_L$.

As a first method, $r_L$ may be derived by calculating a ratio of blocks using the representative mode to the blocks included in the corresponding luma region based on the number of blocks.

For example, a ratio of the number of blocks using the representative mode to the total number of the blocks included in the corresponding luma region may be calculated, and then this ratio may be set to $r_L$. The video decoding apparatus may use this ratio as the weight of the second predictor and may set a value obtained by subtracting the ratio from 1 as the weight of the first predictor generated in the CCLM mode, as shown in Equation 14.

$$pred_C = w_{CCLM} \cdot pred_{CCLM} + (1 - w_{CCLM}) \cdot pred_{intra}, \quad \text{[Equation 14]}$$

$$\left( r_L = 1 - w_{CCLM} = \frac{\text{number of blocks using representative mode}}{\text{number of all blocks in corresponding luma region}} \right)$$

Figure 28:
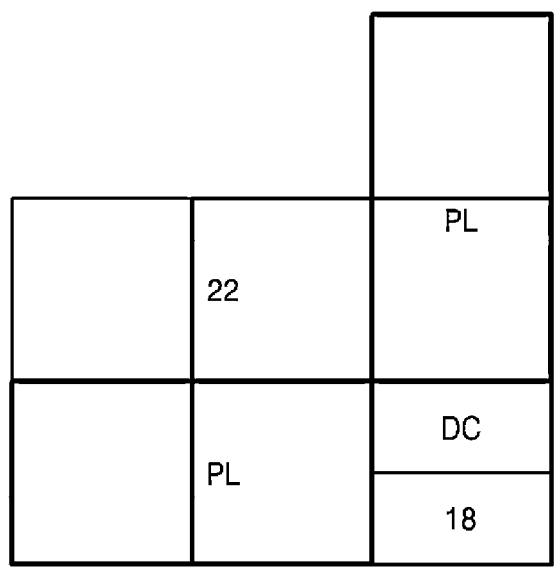
FIGS. 28 and 29 are illustrative diagrams illustrating a distribution and prediction modes of blocks included in a corresponding luma region according to another embodiment of the present disclosure.

A case in which the block distribution and prediction modes of the blocks included in the corresponding luma region are the same as in the example in FIG. 28 is assumed. In the example of FIG. 28, there are a total of five blocks included in the corresponding luma region, and two of the blocks use the planar mode, which is the representative mode. Therefore, the video decoding apparatus may set 2/5 as the weight of the second predictor and 3/5 as the weight of the first predictor generated in the CCLM mode according to Equation 14. When the plurality of additional predictors is subject to a weighted combination, the weight of each additional predictor may be calculated in the same way, and then the video decoding apparatus may set the value obtained by subtracting the sum of the weights of the additional predictors from 1 as the weight of the first predictor.

As a second method, $r_L$ may be derived by calculating a ratio of blocks using the representative mode to the blocks included in the corresponding luma region based on the block area.

For example, a ratio of an area in which the blocks using the representative mode overlap with the corresponding luma region to an area of the corresponding luma region may be calculated and then, may be set to $r_L$. The video decoding apparatus may use this ratio as the weight of the second predictor and may set a value obtained by subtracting the ratio from 1 as the weight of the first predictor generated in the CCLM mode, as shown in Equation 15.

$$pred_C = w_{CCLM} \cdot pred_{CCLM} + (1 - w_{CCLM}) \cdot pred_{intra}, \quad \text{[Equation 15]}$$

$$\left( r_L = 1 - w_{CCLM} = \frac{\text{overlapping area with blocks using representative mode}}{\text{area of corresponding luma region}} \right)$$

Figure 29:
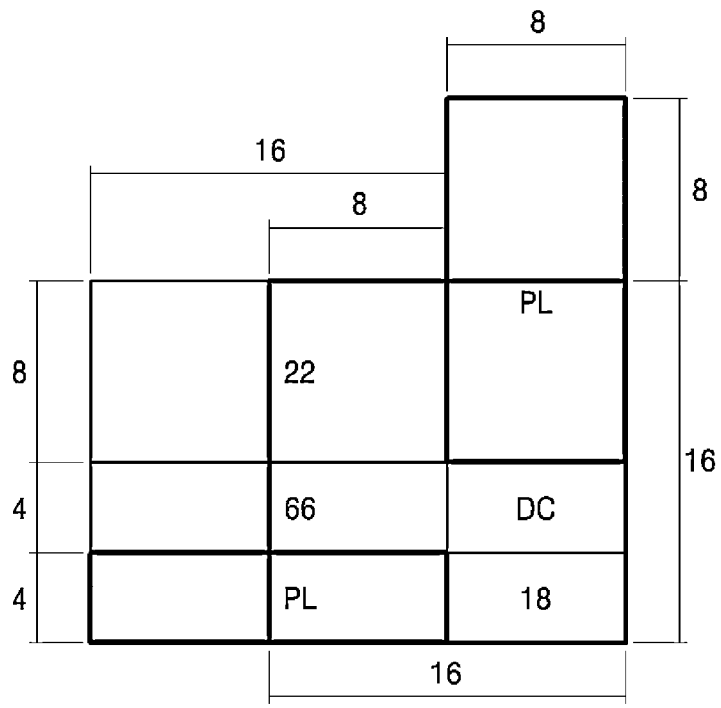

A case in which the block distribution and prediction modes of the blocks included in the corresponding luma region are as in FIG. 29 is assumed. In the example of FIG. 29, a total area of the corresponding luma region is 256, and an overlapping area between the blocks using the planar mode that is a representative mode among the blocks and the corresponding luma region is 96. Therefore, the video decoding apparatus may set 96/256 as the weight of the second predictor and 160/256 as the weight of the first predictor generated in the CCLM mode according to Equation 15. When the plurality of additional predictors is subject to a weighted combination, the weight of each additional predictor may be calculated in the same way, and then the video decoding apparatus may set the value obtained by subtracting the sum of the weights of the additional predictors from 1 as the weight of the first predictor.

In the present example, when the number of all blocks using the representative mode or the overlapping area with all the blocks is not in the form of a power of 2 in a process of calculating the luma pixel correlation $r_L$ and this is implementing in hardware, complexity may greatly increase in a division process. Therefore, the video decoding apparatus may approximate each denominator and numerator in the form of a power of 2 using an operation similar to that shown in Equation 13 and then may derive the luma pixel correlation using Equation 14 and Equation 15 in the process of deriving the luma pixel correlation.

Example 2-4

Setting According to Position of Pixel in Current Chroma Block

In the present example, the weight is set for each pixel in the predictor, unlike the three examples described above in which a single equal weight is set for all the predictors. To set the weight for each pixel, an separate weight may be set for each pixel, but it may be more effective to group the pixels and then set a weight for each group. Therefore, in the present example, the video decoding apparatus groups the pixels of the predictor and then sets a weight for each group.

Figure 30:
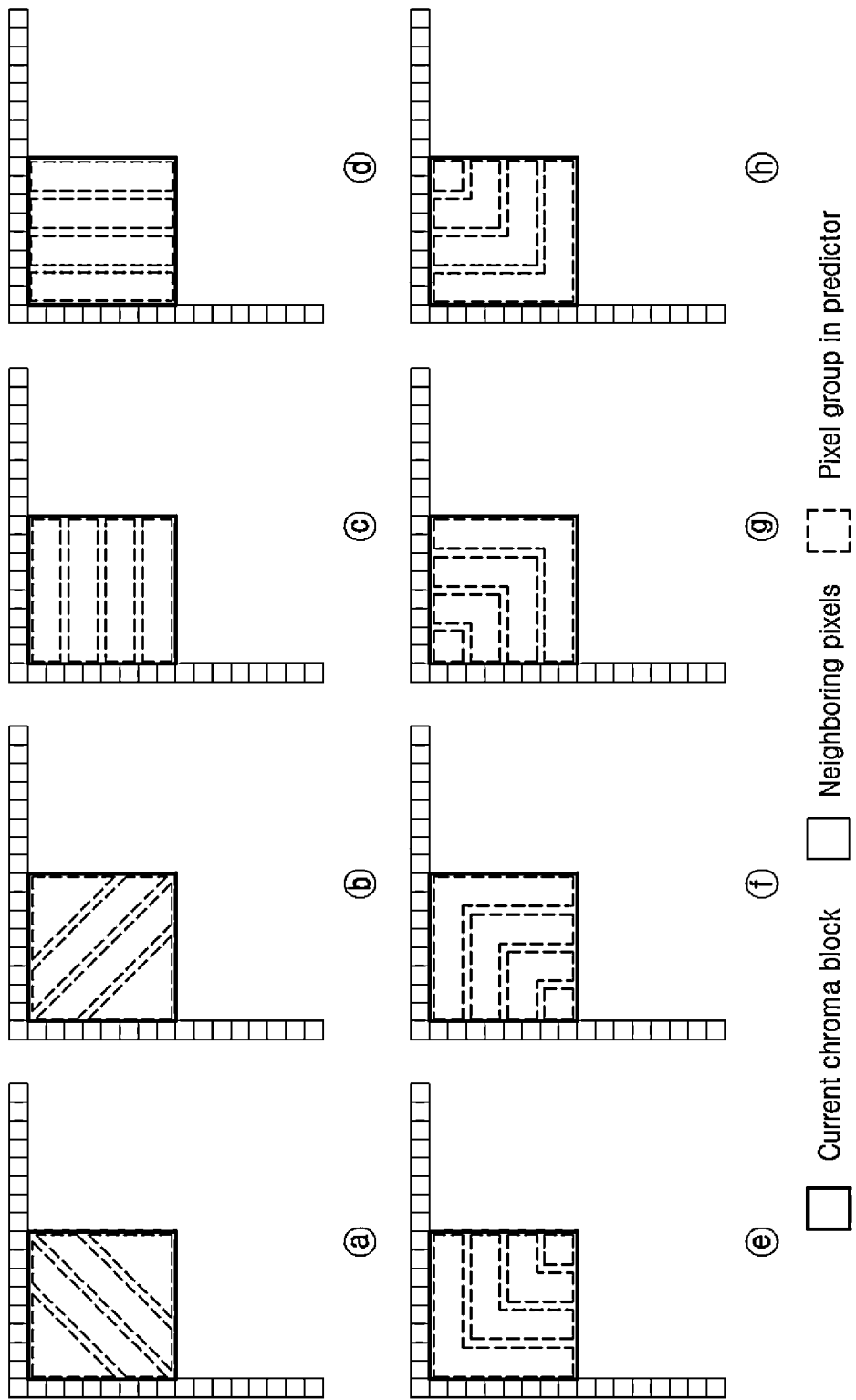
FIG. 30 is an illustrative diagram illustrating methods of grouping pixels in a predictor of the current chroma block according to an embodiment of the present disclosure.

The pixels in the predictor can be grouped according to various methods, as illustrated in FIG. 30. In the example of FIG. 30, four groups are used for each method, but the number of groups may vary depending on a size, shape, or the like of the block.

The video decoding apparatus may fixedly use one of grouping methods ⓐ-ⓗ of FIG. 30 to group pixels or may determine the grouping method based on the representative mode. For example, for prediction modes in which both top neighboring pixels and left neighboring pixels are all used (i.e., the planar mode, DC mode, prediction modes with numbers from 19 to 49, and the like), grouping methods such as ⓐ, ⓔ, and ⓖ in FIG. 30 may be used. Further, for prediction modes in which only the left neighboring pixels are used (i.e., prediction modes with number 18 or less, the DC mode, and the like), grouping methods such as ⓐ, ⓑ, ⓓ, ⓔ, and ⓐ of FIG. 30 may be used. Further, for prediction modes in which only the top neighboring pixels are used (i.e., prediction the mode with number 50 or more, the DC mode, and the like), grouping methods such as ⓐ, ⓑ, ⓒ, ⓔ, and ⓕ of FIG. 30 may be used.

Meanwhile, the grouping methods ⓐ, ⓒ, and ⓓ of FIG. 30 are very similar to a method of grouping luma pixels in the predictor according to a distance from neighboring pixels, when a Position Dependent Prediction Combination (PDPC) technology for correcting an intra predictor of the luma channel is applied. In the PDPC technology, when a position of a predictor pixel is far from a position of a used neighboring pixel for an initial predictor generated using values of neighboring pixels according to the intra prediction mode, a neighboring pixel in an opposite direction of a prediction mode direction line and the predictor pixel are subject to weighted combination according to a distance between the neighboring pixel in the opposite direction and the predictor pixel to complement the predictor pixel. In this case, as the distance between the predictor pixel and the neighboring pixel in the opposite direction becomes shorter, a weight of the neighboring pixel in the opposite direction increases. The PDPC technology may be applied to a prediction mode in which it is possible to use neighboring pixels in the opposite direction of the prediction mode direction line. These prediction modes include a mode smaller than the horizontal direction mode (the mode with number 18), a mode greater than the vertical direction mode (the mode with number 50), and four specific modes (planar mode, DC mode, horizontal direction mode (the mode with number 18), and vertical direction mode (number 50).

In the PDPC technology, a predictor according to the planar mode and the DC mode is corrected using Equation 16, a predictor according to the horizontal direction mode (the mode with number 18) is corrected using Equation 17, and a predictor according to the vertical direction mode (the mode with number 50) is corrected using Equation 18. Further, in the PDPC technology, a predictor according to a mode smaller than the horizontal direction mode (the mode with number 18) is corrected using Equation 19, and a predictor according to a mode greater than the vertical direction mode (the mode with number 50) is corrected using Equation 20.

nScale=(log 2(*nTbW*)+log 2(*nTbW*)−2)>>2

$wL[x]$=32>>((*x*<<1))>>nScale)

$wT[y]$=32>>((*y*<<1))>>nScale)

pred[*x*][*y*]=Clip1((*p*[−1][*y*]·$wL[x]$+*p*[*x*][−1]·$wL[y]$+
   (64×$wL[x]$−$wT[y]$)·pred[*x*][*y*]+32)>>6)    [Equation 16]

nScale=(log 2(nTbW)+lo⌊2(nTbW)»2 wL[x]=0, wT[y]=32»((y«1))»nScale)

wT[y]=32»((y«1))»nScale)

pred[x][y]=Clip1((p[x][−1]−p[−1][−1]+pred[x][y])·wT[y]+(64×wT[y])·pred[x][y]+32)»6)  [Equation 17]

nScale=(log 2(nTbW)+log 2(nTbW)−2)»2 wL[x]=32»((x«1))»nScale), wT[y]=0 wT[y]=32»((y«1))»nScale)

pred[x][y]=Clip1(((p[−1][y]−p[−1][−1]+pred[x][y])·wL[x]+(64−wL[x])·pred[x][y]+32)»6)  [Equation 18]

nScale=min(2, log 2(nTbW)−Floor(log 2(3·invAngle−2))+8)

dX[x][y]=x+((y+1)·invAngle+256)»9 refT[x][y]=(y<(3<<nScale))?p[dX[x][y]][−1]:0 wL[x]=0, wT[y]=32»((y«1)»nScale)

pred[x][y]=Clip1((refT[x][y]·wT[y](64−wT[y])·predd[x][y]+32)»6)  [Equation 19]

nScale=min(2, log 2(nTbW)−Floor(log 2(3·invAngle−2))+8)

dY[x][y]=y+((x+1)·invAngle+256)»9 refT[x][y]=(x<(3<<nScale))?p[−1[dY][x][y]]:0 wL[x]=»((x«1)»nScale), wT[y]=0 pred[x][y]=Clip1((refL[x][y]·wL[x]+(64−wL[x])·pred[x][y]+32)»6)  [Equation 20]

Here, [x][y] represents a relative pixel with reference to the coordinates of the top left pixel of the current block. pred[x][y] is the initial predictor created in the prediction mode, and p[x][−1] and p[−1][y] are neighboring pixels used for predictor correction. nTbW and nTbH represent a width and height of the current block, and wL[x] and wT[y] represent weights applied to the predictor pixel and neighboring pixels. Clip1 is a clipping function and is represented as Equation 21.

Clip1(x) = Clip3(0, 1<< BitDepth, x)  [Equation 21]

$$\text{Clip3}(x, y, z) = \begin{cases} x(z < x) \\ y(z > y) \\ z(\text{otherwise}) \end{cases}$$

Further, invAngle is a variable used to specify positions of neighboring pixels that are needed at the time of generating the predictor according to each direction in the intra prediction mode. In the VVC technology, invAngle is calculated as illustrated in Equation 22.

$$invAngle = \text{Round}\left(\frac{(512 \cdot 32)}{intraPredAngle}\right) \quad \text{[Equation 22]}$$

Here, intraPredAngle is a value determined according to the intra prediction mode (PredModeIntra).

In a PDPC method, since schemes to be applied in the horizontal direction mode or vertical direction mode are schemes for correcting the predictor using change values of the neighboring pixels, the schemes are not compatible with the present embodiment. Therefore, schemes that are applied when the representative mode is the planar mode, the DC mode, a mode smaller than the horizontal direction mode (the mode with number 18), and a mode greater than the vertical direction mode (the mode with number 50) may be applied to the weighted combination method according to the embodiment. Using the last parts of Equations 15, 18, and 19, pred[x][y] is replaced with the second predictor pred$_{intra}$[x][y] generated by the representative mode, and p[x][−1], p[−1][y], refL[x][y], and refT[x][y] are replaced with the first predictor pred$_{CCLM}$[x][y] generated by the CCLM mode. Thus, a weight of the predictor pixel generated in the representative mode increases as a distance to the neighboring pixel used at the time of prediction in the representative mode is shorter.

In the present embodiment, the predictor according to planar mode and the DC mode is corrected using Equation 23. Further, in the present embodiment, a predictor according to the mode smaller than the horizontal direction mode (the mode with number 18) is corrected using Equation 24, and a predictor according to the mode greater than the vertical direction mode (the mode with number 50) is corrected using Equation 25. According to Equations 23 to 25, an existing PDPC correction principle can be compatible with the present example as it is.

pred$_C$[x][y]=Clip1((pred$_{CCLM}$[x][y]·(wL[x]+wT[y])+(64−wL[x]+wT[y])·pred$_{intra}$[x][y]+32)»6)  [Equation 23]

pred$_C$[x][y]=Clip1((pred$_{CCLM}$[x][y]·wT[y]+(64−wT[y])·pred$_{intra}$[x][y]+32)»6)  [Equation 24]

pred$_C$[x][y]=Clip1((pred$_{CCLM}$[x][y]·wL[x]+(64−wL[x])·pred$_{intra}$[x][y]+32)»6)  [Equation 24]

Meanwhile, when the PDPC method is not utilized, the video decoding apparatus may set a weight for each group in consideration of the distance from neighboring pixels after predictor pixels are grouped. The weight of the first predictor according to the CCLM prediction is set to be larger as a distance from the neighboring pixels is longer, and the weight of the second predictor according to the representative mode is set to be smaller as the distance from the neighboring pixels is longer.

Figure 31:
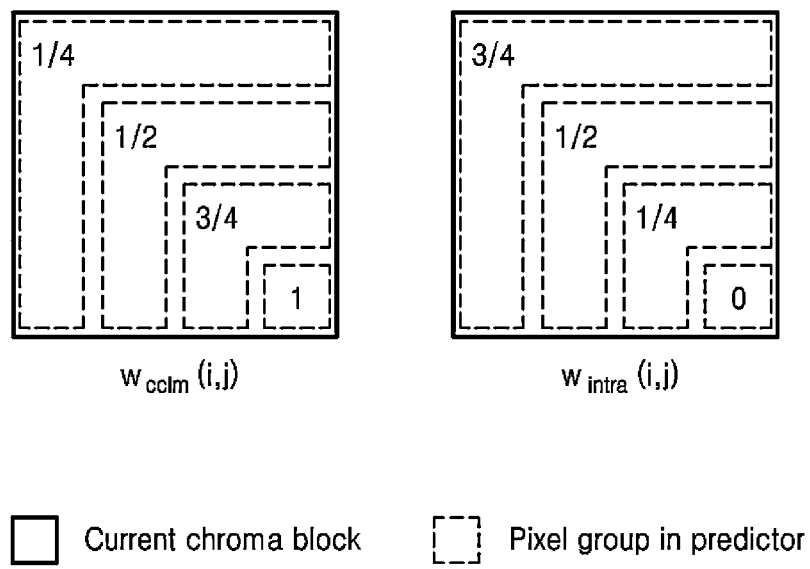
FIG. 31 is an illustrative diagram illustrating weights of a first predictor and a second predictor according to an embodiment of the present disclosure.

For example, when pixels are grouped using a method (e) of FIG. 30, weights of the first predictor and the second predictor may be set as in the example of FIG. 31. In the example of FIG. 31, a predictor predc(0,0) for a position (0, 0) of the current chroma block may be calculated as in Equation 26.

$$pred_C(0, 0) = \left(\frac{1}{4} \cdot pred_{CCLM}(0, 0) + \frac{3}{4} \cdot pred_{intra}(0, 0)\right) \quad \text{[Equation 26]}$$

Figure 32:
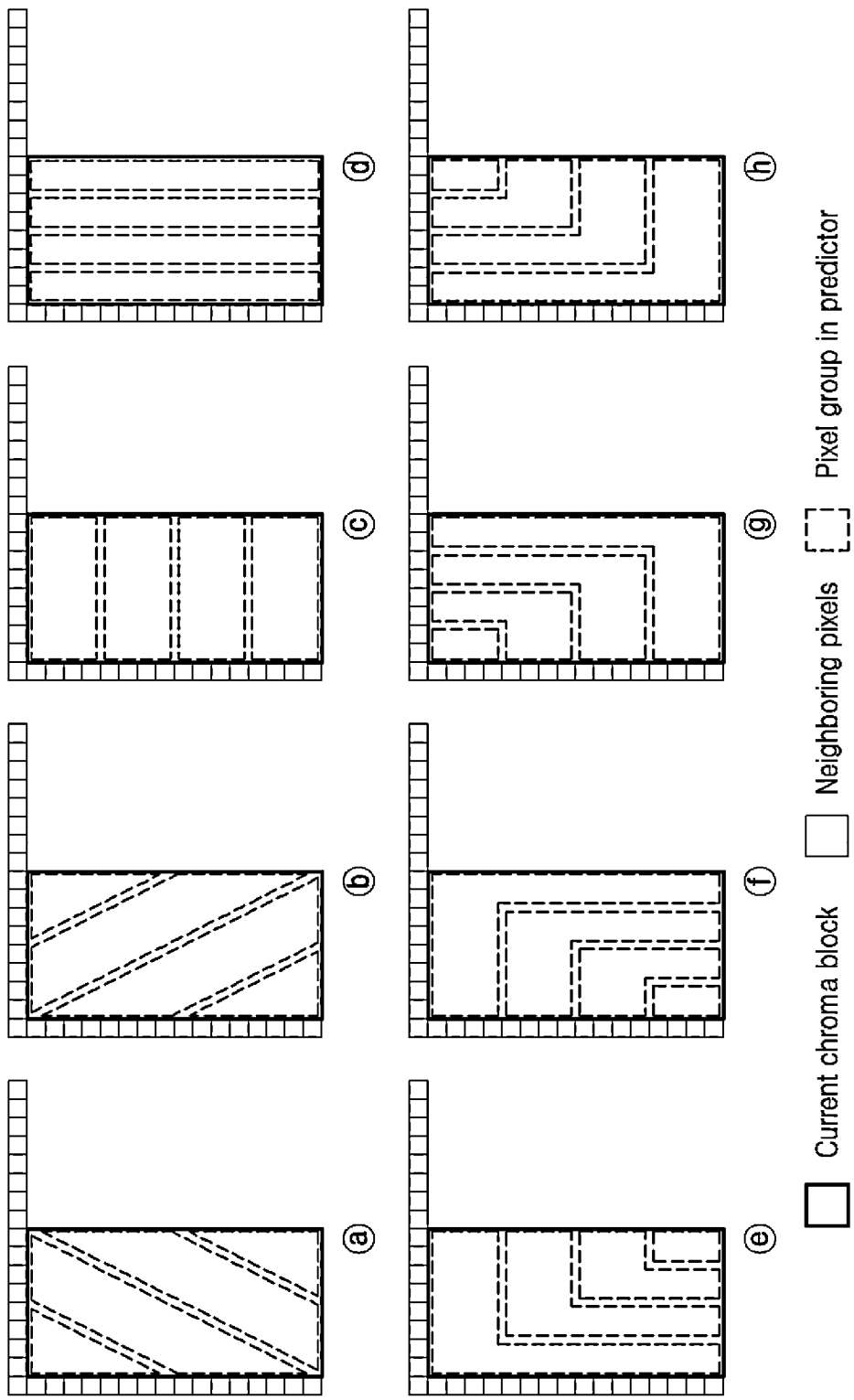
FIGS. 32 and 33 are illustrative diagrams illustrating methods of grouping pixels in a predictor of a current chroma block according to another embodiment of the present disclosure.
Figure 33:
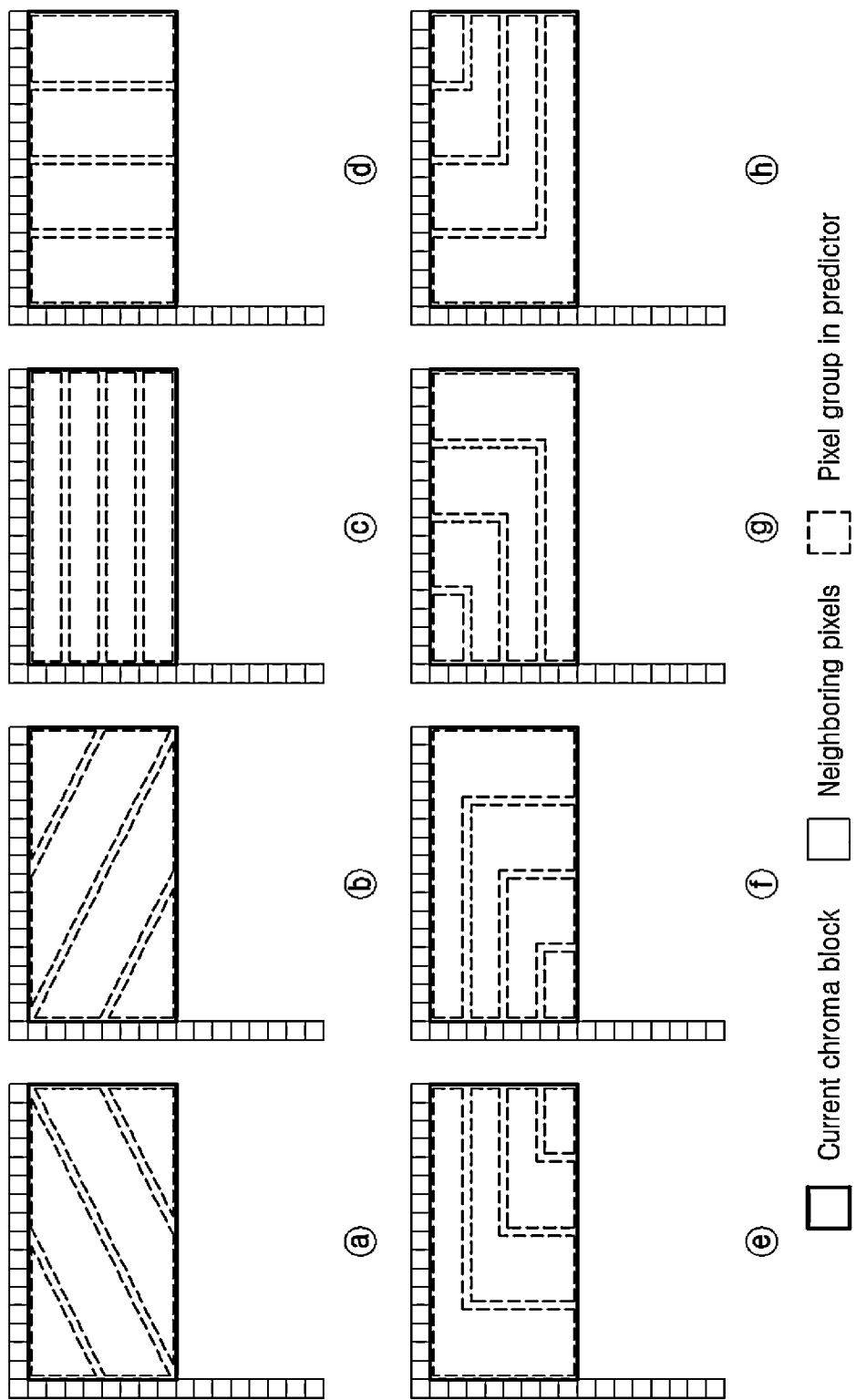

An example of FIG. 30 illustrates grouping methods when the current chroma block has a square shape. When the current block has a rectangular shape, the grouping methods illustrated in FIG. 30 may be modified according to the rectangular block, and the modified grouping methods may be used. For example, an example of FIG. 32 illustrates grouping methods for a rectangular block in which a height is greater than a width, and an example of FIG. 33 illustrates grouping methods for a rectangular block in which a width is greater than a height.

EXAMPLE 3

Method of Signaling Prediction Mode of Second Predictor and Weight

In the present example, the video decoding apparatus does not infer information for intra prediction of the current chroma block and uses information signaled from the video encoding apparatus. In other words, prediction mode-related information of the second predictor, weighted combination-related information, and the like are transmitted from the video encoding apparatus to the video decoding apparatus. Further, whether or not the present embodiment is applied may be signaled from the video encoding apparatus to the video decoding apparatus.

Example 3-1

Method of Signaling Information Related to Prediction Mode

In the present example, information related to a prediction mode for second predictor generation (hereinafter referred to as 'representative mode') is directly signaled from the video encoding apparatus to the video decoding apparatus. In this case, the related information includes the number of representative modes, the representative mode derivation method, the representative mode index, and the like.

As a first method, the representative mode number may be signaled as follows. For example, as shown in Table 3, the number of representative modes sps_ccip_extra_mode_num is defined in advance on the high level (for example, SPS).

TABLE 3

| [SPS Syntax Level] |
| --- |
| sps_ccip_extra_mode_num |

The video encoding apparatus encodes a predefined number of representative modes and then includes the number in the bitstream and signals the bitstream to the video decoding apparatus. Here, ccip in a variable name is an abbreviation for 'Cross CCLM Intra Prediction'. Hereinafter, ccip is inserted into a variable name of a signal related to the present embodiment.

The video decoding apparatus parses sps_ccip_extra_mode_num in the bitstream. Thereafter, the number of representative modes to be derived at the time of performing of the prediction is determined according to a value of sps_ccip_extra_mode_num.

As another example, the number of representative modes may be signaled each time prediction is performed at the CU level. The intra prediction mode parsing process for the chroma channel described above in Table 2 may be changed as in the example in Table 4. According to Table 4, cclm_mode_idx is parsed, and then ccip_extra_mode_num is additionally parsed, so that information on the number of representative modes required at the time of prediction of each block may be signaled.

TABLE 4

| [CU Level] |
| --- |
| if( CclmEnabled ) |
| cclm_mode_flag |

TABLE 4-continued

| [CU Level] |
| --- |
| if( cclm_mode_flag ) |
| cclm_mode_idx |
| ccip_extra_mode_num |
| else |
| intra_chroma_pred_mode |

As the second method, the representative mode derivation method may be signaled as follows. First, the representative mode derivation methods presented in Example 1 may be classified by index as shown in Table 5.

TABLE 5

| (sps_)ccip_mode_infer_idx | Representative mode derivation method |
| --- | --- |
| 0 | Example 1-1 |
| 1 | Example 1-2 |
| 2 | Example |
| . | . |
| . | . |
| . | . |

Thereafter, as shown in Table 6, an index sps_ccip_mode_infer_idx of the representative mode derivation method is defined in advance on the upper level.

TABLE 6

| [SPS Syntax Level] |
| --- |
| sps_ccip_mode_infer_idx |

The video encoding apparatus encodes an index of the predefined representative mode derivation method and then includes the index in the bitstream and signals the resultant bitstream to the video decoding apparatus. The video decoding apparatus parses sps_ccip_mode_infer_idx in the bitstream. Thereafter, the representative mode derivation method to be used when prediction is performed is determined according to a value of sps_ccip_mode_infer_idx.

As another example, the representative mode derivation method may be signaled each time prediction is performed at the CU level. As shown in Table 7, in the intra prediction mode parsing process for the chroma channel, cclm_mode_idx is parsed, and then ccip_mode_infer_idx is additionally parsed, so that the representative mode derivation method to be used at the time of prediction of each block can be signaled.

TABLE 7

| [CU Level] |
| --- |
| if( CclmEnabled ) |
| cclm_mode_flag |
| if( cclm_mode_flag ) |
| cclm_mode_idx |
| ccip_mode_infer_idx |
| else |
| intra_chroma_pred_mode |

As the third method, an index of the representative mode may be signaled each time prediction is performed at the CU level. As shown in Table 8, in the intra prediction mode parsing process for the chroma channel, cclm_mode_idx is parsed, and then ccip_extra_mode_idx is additionally parsed, so that the representative mode to be used at the time of prediction of each block can be signaled.

TABLE 8

[CU Level]

if( CclmEnabled )
   cclm_mode_flag
   if( cclm_mode_flag )
      cclm_mode_idx
      ccip_extra_mode_idx
   else
      intra_chroma_pred_mode In this case, ccip_extra_mode_idx indicates one index when the number of representative modes is 1. Further, ccip_extra_mode_idx may be a list of several representative mode indices when a plurality of representative modes are used.

As an example of the present example, a representative mode derivation method may be signaled while the information on the number of representative modes is being signaled. Alternatively, a preset number of representative modes may be used without representative mode number information being signaled, and the index of the representative mode may be signaled instead of information on the representative mode derivation method. In addition, various combinations of relevant information to be signaled and relevant information not to be signaled are selected so that various prediction methods can be created.

Example 3-2

Method of Signaling Weighted Combination-Related Information

In the present example, weighted combination-related information is signaled from the video encoding apparatus to the video decoding apparatus. In this case, the weighted combination-related information includes a weighted combination method, the method of grouping pixels within the block in Example 2-4, a weighted combination weight, and the like.

As a first method, the weighted combination method may be signaled as follows. First, the weighted combination methods presented in Realization Example 2 may be classified by index as shown in Table 9.

TABLE 9

| (sps_)ccip_weight_calc_mode_idx | Weighted combination method |
|---|---|
| 0 | Example 2-1 |
| 1 | Example 2-2 |
| 2 | Example 2-3 |
| 3 | Example 2-4 |
| . | . |
| . | . |
| . | . |

Thereafter, as shown in Table 10, an index sps_ccip_weight_calc_mode_idx of the weighted combination method is defined in advance on the high level (for example, SPS).

TABLE 10

[SPS Syntax Level]

sps_ccip_weight_calc_mode_idx

The video encoding apparatus encodes the index of the predefined weighted combination method and then includes the index in the bitstream and signals the bitstream to the video decoding apparatus. The video decoding apparatus parses sps_ccip_weight_calc_mode_idx in the bitstream. Thereafter, the weighted combination method to be used at the time of performing the prediction is determined according to the value of sps_ccip_weight_calc_mode_idx.

As another example, the weighted combination method may be signaled each time prediction is performed at the CU level. As shown in Table 11, in the intra prediction mode parsing process for the chroma channel, cclm_mode_idx is parsed, and then ccip_weight_calc_mode_idx is additionally parsed, so that the weighted combination method to be used at the time of prediction of each block can be signaled.

TABLE 11

[CU Level]

if( CclmEnabled )
   cclm_mode_flag
   if( cclm_mode_flag )
      cclm_mode_idx
      ccip_weight_calc_mode_idx
   else
      intra_chroma_pred_mode As a second method, the method of grouping pixels within the block may be signaled each time prediction is performed at the CU level. The signaling of the grouping method is applied when the weight is set differently for each pixel position in the block in the weighted combination method of Example 2-4. Since available grouping methods are different depending on the representative modes, the grouping methods may be classified by index as shown in Table 12.

TABLE 12

| ccip_weight_group_idx | Grouping method for pixels in block |
|---|---|
| 0 | ⓐ in FIGS. 30, 32 and 33 |
| 1 | ⓑ in FIGS. 30, 32 and 33 |
| 2 | ⓒ in FIGS. 30, 32 and 33 |
| 3 | ⓓ in FIGS. 30, 32 and 33 |
| 4 | ⓔ in FIGS. 30, 32 and 33 |
| 5 | ⓕ in FIGS. 30, 32 and 33 |
| 6 | ⓖ in FIGS. 30, 32 and 33 |
| 7 | ⓗ in FIGS. 30, 32 and 33 |

Thereafter, as shown in Table 13, in the intra prediction mode parsing process for the chroma channel, cclm_mode_idx is parsed, and then ccip_weight_group_idx is additionally parsed so that the grouping method to be used at the time of prediction of each block can be signaled.

TABLE 13

[CU Level]

if( CclmEnabled )
   cclm_mode_flag
   if( cclm_mode_flag )
      cclm_mode_idx

TABLE 13-continued

[CU Level]

ccip_weight_group_idx
else
   intra_chroma_pred_mode

As the third method, a weight of the weighted combination may be signaled each time prediction is performed at the CU level. As shown in Table 14, in the intra prediction mode parsing process for the chroma channel, cclm_mode_idx is parsed and then ccip_pred_weight is additionally parsed, so that the weight value to be applied to each predictor at the time of prediction of each block can be signaled.

TABLE 14

[CU Level]

if( CclmEnabled )
  cclm_mode_flag
  if( cclm_mode_flag )
    cclm_mode_idx
    ccip_pred_weight
else
  intra_chroma_pred_mode In this case, ccip_pred_weight represents one weight for the first predictor (or second predictor) when the number of representative modes is one. Further, in ccip_pred_weight, when a plurality of representative modes are used, the number of weights constituting the list may increase depending on the number of representative modes.

Example 3-3

Method of Signaling Whether or Not the Present Disclosure Is Applied

Whether or not the present disclosure is applied may be signaled as follows depending on the embodiment. In the present example, a flag sps_ccip_mode_flag is defined on a higher level (for example, SPS), as shown in Table 15, to indicate the use of an improved predictor according to a combination of the examples of the present disclosure (i.e., the predictor $pred_C$ shown in Equations 3 and 4) for an existing predictor according to the CCLM mode.

TABLE 15

[SPS Syntax Level]

sps_ccip_mode_flag

The video encoding apparatus encodes the flag sps_ccip_mode_flag indicating the use of a predefined improved predictor and then includes the flag in a bitstream and signals the bitstream to the video decoding apparatus.

The video decoding apparatus can generate the predictor using the existing CCLM mode when sps_ccip_mode_flag=0 and using the improved CCLM mode when sps_ccip_mode_flag=1.

As an example of the present disclosure, Example 3-1 and Example 3-2 can be combined. For example, when whether or not the present disclosure is applied is signaled and a determination is made that the present disclosure is applied, the methods of Example 3-1 and Example 3-2 can then be applied.

Whether or not the present disclosure is applied may be signaled at a high level as shown in Table 15 but may also be signaled at a low level. In other words, application of the present disclosure may be determined using ccip_mode_flag at the CU level. The video decoding apparatus uses the existing CCLM mode when ccip_mode_flag is 0, and the video decoding apparatus performs weighted combination on the first predictor according to the CCLM mode and the second predictor according to the intra prediction mode to generate a final predictor when ccip_mode_flag is 1.

The video decoding apparatus may parse ccip_mode_flag as shown in Tables 16 and 17 depending on the type of prediction mode.

TABLE 16

[CU Level]

if( CclmEnabled )
  cclm_mode_flag
  if( cclm_mode_flag )
    ccip_mode_flag
    cclm_mode_idx
else
  intra_chroma_pred_mode

TABLE 17

[CU Level]

if( CclmEnabled )
  cclm_mode_flag
  if( cclm_mode_flag )
    cclm_mode_idx
  else
    ccip_mode_flag
    intra_chroma_pred_mode Alternatively, as shown in Table 18, ccip_mode_flag may be parsed regardless of the type of prediction mode.

TABLE 18

[CU Level]

ccip_mode_flag
if( CclmEnabled )
  cclm_mode_flag
  if( cclm_mode_flag )
    cclm_mode_idx
else
  intra_chroma_pred_mode Meanwhile, when the prediction mode is one of the CCLM modes and ccip_mode_flag is 1, the representative mode according to the present disclosure may be the co-channel prediction mode in which a predictor is generated using the information on the same channel (②). On the other hand, when the prediction mode is one of the prediction modes using the same channel information and ccip_mode_flag is 1, the representative mode according to the present disclosure may be a cross-component prediction mode in which a predictor is generated using the information on the corresponding luma region (①).

EXAMPLE 4

Method of Adaptively Determining Whether or Not to Apply the Present Disclosure

The present example describes a method of inferring whether or not to apply the present disclosure to the current block in consideration of at least one of conditions to be described below. The video encoding apparatus and the video decoding apparatus can equally infer whether or not to apply the present disclosure, without signaling whether or not to apply the present disclosure. To this end, information such as a width/height/area of the current block, the prediction mode of the neighboring chroma block or corresponding luma block, a correlation between the current chroma block and neighboring pixels, a correlation between the current chroma block and the corresponding luma pixels, and a correlation between reference samples of the current chroma block and corresponding luma pixels may be considered as conditions.

As a first example, whether or not to apply the present disclosure may be adaptively determined depending on a size of the current block. The video encoding apparatus and the video decoding apparatus may apply the present disclosure when an area of the block is equal to or greater than a preset threshold value, and may not apply the present disclosure when the area of the block is smaller than the preset threshold value. In this case, the threshold value may be set in advance to any value, such as 16, 32, or 64. In addition, whether or not to apply the present disclosure may be determined based on various area conditions.

As a second example, whether or not to apply the present disclosure may be adaptively determined using the neighboring pixel correlation and the luma pixel correlation shown in Examples 2-2 and 2-3 among methods of combining a plurality of predictors in Example 2. The neighboring pixel correlation $r_C$ is a numerical value of a correlation between the current block and adjacent blocks and may be calculated as shown in Equations 10 to 12. The luma pixel correlation $r_L$ is a numerical value of a correlation between the blocks in the corresponding luma region and the current chroma block and may be calculated as shown in Equation 14 and Equation 15. The video encoding apparatus and the video decoding apparatus may derive the neighboring pixel correlation or the luma pixel correlation. The video encoding apparatus and the video decoding apparatus may not apply the present disclosure when a value of the correlation is smaller than a preset threshold value, and may apply the present disclosure when the value is equal to or greater than the preset threshold value. In this case, since the correlation value is distributed between 0 and 1, the threshold value may be set in advance to any value such as 0.2, 0.25, 0.3, or 0.5.

As a third example, a correlation between two sample sets may be calculated for reference samples and corresponding luma samples of the current chroma block, and then whether or not to apply the present disclosure may be adaptively determined depending on a value of the calculated correlation. In this case, the correlation may be represented as a correlation coefficient $\rho$ obtained by converting a linear correlation between two variables into a numerical value, as shown in Equation 27.

$$\rho = \frac{\sum_{i=1}^{n}(C_i - C_m)(L_i - L_m)}{\sqrt{\sum_{i=1}^{n}(C_i - C_m)^2}\sqrt{\sum_{i=1}^{n}(L_i - L_m)^2}} \qquad \text{[Equation 27]}$$

Here, C indicates a chroma reference samples, L indicates the corresponding luma samples, and n indicates the total number of chroma reference samples. Further, $C_m$ indicates an average of the chroma reference samples and $L_m$ is an average of corresponding luma samples. The correlation coefficient $\rho$ is a value between −1 and 1 and indicates that there is a higher linear relationship between two variables as an absolute value of correlation coefficient $\rho$ is close to 1.

The video encoding apparatus and the video decoding apparatus may derive $\rho$ and compare $\rho$ with a preset threshold value to determine whether or not to apply the present disclosure. In a case in which the prediction mode of the current block is the CCLM mode, the present disclosure may not be applied when an absolute value of $\rho$ is equal to or greater than the preset threshold value, and the present disclosure may be applied when the absolute value of $\rho$ is smaller than the preset threshold value. On the other hand, in a case in which the prediction mode of the current block is a prediction mode in which the intra predictor is generated, the present disclosure may be applied when the absolute value of $\rho$ is equal to or greater than the preset threshold value, and the present disclosure may not be applied when the absolute value of $\rho$ is smaller than the preset threshold value. In this case, since the absolute value of $\rho$ is distributed between 0 and 1, the threshold value may be set in advance to any value such as 0.2, 0.25, 0.3, or 0.5.

In addition, a correlation between the chroma component and the luma component may be measured using various methods, and then whether or not the present disclosure is applied may be determined based on the measured correlation.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the resent disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

122: intra predictor
542: intra predictor
802: input unit
804: first predictor generator
806: second predictor generator
808: weighted summer

What is claimed is:

1. An intra prediction method for a current chroma block performed by a video decoding apparatus, the intra prediction method comprising:
   determining a cross-component prediction mode for cross-component prediction for the current chroma block, wherein the cross-component prediction includes predicting the current chroma block using pixels in a corresponding luma region of the current chroma block;
   generating a first predictor of the current chroma block by performing the cross-component prediction based on the cross-component prediction mode;
   inferring, as a representative mode, an intra prediction mode derived from neighboring regions of the current chroma block;
   generating a second predictor of the current chroma block by performing intra prediction using neighboring pixels of the current chroma block based on the representative mode;
   deriving weights for the first predictor and the second predictor; and
   generating an intra predictor of the current chroma block by performing weighted sum on the first predictor and the second predictor using the weights.

2. The intra prediction method of claim 1, wherein inferring the representative mode includes setting, as the representative mode, a prediction mode of a block including a neighboring pixel at a specific position among the neighboring pixels of the current chroma block.

3. The intra prediction method of claim 1, wherein inferring the representative mode includes setting a most frequent prediction mode derived based on a number of blocks among prediction modes of adjacent blocks of the current chroma block as the representative mode.

4. The intra prediction method of claim 1, wherein inferring the representative mode includes setting a most frequent prediction mode derived based on a block area among prediction modes of adjacent blocks of the current chroma block as the representative mode.

5. The intra prediction method of claim 1, wherein inferring the representative mode includes setting a most frequent prediction mode derived based on a prediction mode of a block including each neighboring pixel of the current chroma block as the representative mode.

6. The intra prediction method of claim 1, wherein inferring the representative mode includes setting, as the representative mode, a prediction mode of a block of which an aspect ratio is the same as or most similar to aspect ratio of the current chroma block among adjacent blocks of the current chroma block.

7. The intra prediction method of claim 1, wherein deriving the weights includes generating a neighboring pixel correlation based on a correlation between the current chroma block and adjacent blocks of the current chroma block, setting the neighboring pixel correlation as a weight of the second predictor, and setting a value obtained by subtracting the neighboring pixel correlation from 1 as a weight of the first predictor.

8. The intra prediction method of claim 7, wherein deriving the weights includes calculating a ratio of adjacent blocks using the representative mode to the adjacent blocks of the current chroma block based on a number of blocks to derive the neighboring pixel correlation.

9. The intra prediction method of claim 7, wherein deriving the weights includes calculating a ratio of the adjacent blocks of the current chroma block using the representative mode to the adjacent blocks based on a block area to derive the neighboring pixel correlation.

10. The intra prediction method of claim 7, wherein deriving the weights includes deriving the neighboring pixel correlation based on a ratio of a length of sides of the adjacent blocks of the current chroma block using the representative mode adjacent to the current chroma block to a length of entire side of the current chroma block adjacent to the adjacent blocks.

11. The intra prediction method of claim 1, wherein deriving the weights includes grouping the pixels of the intra predictor into a plurality of groups and setting the weight for each group, wherein the weight of the group including the pixels in the second predictor increases as a distance between the pixels in the second predictor and the neighboring pixels used at a time of generation of the second predictor becomes closer.

12. An intra prediction method for a current chroma block performed by a video encoding apparatus, the intra prediction method comprising:
   determining a cross-component prediction mode for cross-component prediction for the current chroma block, wherein the cross-component prediction includes predicting the current chroma block using pixels in a corresponding luma region for the current chroma block;
   generating a first predictor of the current chroma block by performing the cross-component prediction based on the cross-component prediction mode;
   inferring, as a representative mode, an intra prediction mode derived from neighboring regions of the current chroma block;
   generating a second predictor of the current chroma block by performing intra prediction using neighboring pixels of the current chroma block based on the representative mode;
   deriving weights for the first predictor and the second predictor; and
   generating an intra predictor of the current chroma block by performing weighted sum on the first predictor and the second predictor using the weights.

13. A method for providing a video decoding apparatus with video data, the method comprising:
   encoding the video data into a bitstream; and
   transmitting the bitstream to the video decoding device, wherein encoding the video data comprises:
      determining a cross-component prediction mode for cross-component prediction for a current chroma block, wherein the cross-component prediction includes predicting the current chroma block using pixels in a corresponding luma region for the current chroma block;
      generating a first predictor of the current chroma block by performing the cross-component prediction based on the cross-component prediction mode;

inferring, as a representative mode from prediction modes of adjacent blocks, an intra prediction mode derived from neighboring regions of the current chroma block;
generating a second predictor of the current chroma block by performing intra prediction using neighboring pixels of the current chroma block based on the representative mode;
deriving weights for the first predictor and the second predictor; and
generating an intra predictor of the current chroma block by performing weighted sum on the first predictor and the second predictor using the weights.

* * * * *